US011287758B2

(12) United States Patent
Matsui et al.

(10) Patent No.: US 11,287,758 B2
(45) Date of Patent: *Mar. 29, 2022

(54) TONER AND METHOD FOR PRODUCING TONER

(71) Applicant: CANON KABUSHIKI KAISHA, Tokyo (JP)

(72) Inventors: Takashi Matsui, Mishima (JP); Kenta Kamikura, Yokohama (JP); Kenji Aoki, Numazu (JP); Masao Suzuki, Kawasaki (JP); Tsutomu Shimano, Mishima (JP); Reo Tagawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/907,814

(22) Filed: Jun. 22, 2020

(65) Prior Publication Data

US 2020/0356019 A1     Nov. 12, 2020

Related U.S. Application Data

(63) Continuation of application No. 16/438,566, filed on Jun. 12, 2019, now Pat. No. 10,732,530.

(30) Foreign Application Priority Data

Jun. 13, 2018 (JP) .............................. JP2018-113106
Apr. 10, 2019 (JP) .............................. JP2019-075008

(51) Int. Cl.
| G03G 9/08 | (2006.01) |
| G03G 9/087 | (2006.01) |
| C08F 220/18 | (2006.01) |
| C08F 212/10 | (2006.01) |
| C08F 220/44 | (2006.01) |

(52) U.S. Cl.
CPC ... *G03G 9/08708* (2013.01); *C08F 220/1818* (2020.02); *G03G 9/0806* (2013.01); *G03G 9/08702* (2013.01); *G03G 9/08711* (2013.01); *G03G 9/08728* (2013.01); *G03G 9/08731* (2013.01); *G03G 9/08793* (2013.01); *G03G 9/08797* (2013.01); *C08F 212/10* (2013.01); *C08F 220/44* (2013.01)

(58) Field of Classification Search
CPC .......... G03G 9/08731; G03G 9/08728; G03G 9/08702; G03G 9/08973; G03G 9/0806; G03G 9/08793
See application file for complete search history.

(56) References Cited

U.S. PATENT DOCUMENTS

| 4,960,669 A | 10/1990 | Mori et al. |
| 7,678,523 B2 | 3/2010 | Hiroko et al. |
| 7,842,446 B2 | 11/2010 | Yanase et al. |
| 7,923,190 B2 | 4/2011 | Magome et al. |
| 7,935,467 B2 | 5/2011 | Dojo et al. |
| 8,426,091 B2 | 4/2013 | Magome et al. |
| 8,426,094 B2 | 4/2013 | Magome et al. |
| 8,603,712 B2 | 12/2013 | Aoki et al. |
| 8,614,044 B2 | 12/2013 | Matsui et al. |
| 8,652,725 B2 | 2/2014 | Watanabe et al. |
| 8,741,519 B2 | 6/2014 | Watanabe et al. |
| 8,778,585 B2 | 7/2014 | Matsui et al. |
| 8,785,101 B2 | 7/2014 | Kaya et al. |
| 8,828,639 B2 | 9/2014 | Kamikura et al. |
| 8,841,054 B2 | 9/2014 | Dojo et al. |
| 8,846,284 B2 | 9/2014 | Kinumatsu et al. |
| 8,883,389 B2 | 11/2014 | Matsui et al. |
| 9,097,997 B2 | 8/2015 | Nomura et al. |
| 9,158,216 B2 | 10/2015 | Shimano et al. |
| 9,213,250 B2 | 12/2015 | Nomura et al. |
| 9,217,943 B2 | 12/2015 | Matsui et al. |
| 9,239,528 B2 | 1/2016 | Hasegawa et al. |
| 9,304,422 B2 | 4/2016 | Matsui et al. |
| 9,309,349 B2 | 4/2016 | Watanabe et al. |
| 9,348,246 B2 | 5/2016 | Magome et al. |
| 9,354,545 B2 | 5/2016 | Matsui et al. |
| 9,377,705 B2 | 6/2016 | Shimano et al. |
| 9,383,668 B2 | 7/2016 | Noji et al. |
| 9,429,860 B2 | 8/2016 | Kinumatsu et al. |
| 9,442,416 B2 | 9/2016 | Magome et al. |
| 9,442,419 B2 | 9/2016 | Wakabayashi et al. |

(Continued)

FOREIGN PATENT DOCUMENTS

| EP | 0 703 505 | 3/1996 |
| EP | 0 744 668 | 11/1996 |

(Continued)

OTHER PUBLICATIONS

Fedors, "A Method for Estimating Both the Solubility Parameters and Molar Volumes of Liquids", Polymer Engineering And Science, vol. 14, No. 2 (1974) 147-54.

*Primary Examiner* — Mark A Chapman
(74) *Attorney, Agent, or Firm* — Venable LLP

(57) ABSTRACT

Provided is a toner has a toner particle containing a binder resin and is characterized in that the binder resin contains a polymer A, which is a polymer of a composition containing a first polymerizable monomer, a second polymerizable monomer and a crosslinking agent, the first polymerizable monomer is at least one monomer selected from the group consisting of (meth)acrylic acid esters having an alkyl group with 18 to 36 carbon atoms, the crosslinking agent has two or more polymerizable double bonds, a content of the first polymerizable monomer in the composition is 5.0 to 60.0 mol %, a content of the second polymerizable monomer is 20.0 to 95.0 mol %, and when the SP values of the first polymerizable monomer, the second polymerizable monomer and the crosslinking agent are denoted by $SP_{12}$, $SP_{22}$ and $SP_{C2}$, respectively, the formulae $0.60 \leq (SP_{22}-SP_{12}) \leq 15.00$ and $SP_{12} < SP_{C2} < (SP_{22}+3.00)$ are satisfied.

12 Claims, No Drawings

(56) References Cited

U.S. PATENT DOCUMENTS

| | | |
|---|---|---|
| 9,500,972 B2 | 11/2016 | Tanaka et al. |
| 9,575,424 B2 | 2/2017 | Nakagawa et al. |
| 9,581,934 B2 | 2/2017 | Ito et al. |
| 9,599,919 B2 | 3/2017 | Isono et al. |
| 9,625,844 B2 | 4/2017 | Kaya et al. |
| 9,658,546 B2 | 5/2017 | Tanaka et al. |
| 9,658,554 B2 | 5/2017 | Kinumatsu et al. |
| 9,785,071 B2 | 10/2017 | Shimano et al. |
| 9,798,256 B2 | 10/2017 | Kosaki et al. |
| 9,798,262 B2 | 10/2017 | Toyoizumi et al. |
| 9,811,016 B2 | 11/2017 | Aoki et al. |
| 9,823,595 B2 | 11/2017 | Toyoizumi et al. |
| 9,829,816 B2 | 11/2017 | Tanaka et al. |
| 9,835,964 B2 | 12/2017 | Yoshida et al. |
| 9,857,707 B2 | 1/2018 | Tsuda et al. |
| 9,857,713 B2 | 1/2018 | Kosaki et al. |
| 9,869,943 B2 | 1/2018 | Aoki et al. |
| 9,880,478 B2 | 1/2018 | Shimano et al. |
| 9,904,195 B2 | 2/2018 | Matsui et al. |
| 9,921,501 B2 | 3/2018 | Mochizuki et al. |
| 9,952,523 B2 | 4/2018 | Shimano et al. |
| 9,958,801 B2 | 5/2018 | Tanaka et al. |
| 10,012,919 B2 | 7/2018 | Matsui et al. |
| 10,078,279 B2 | 9/2018 | Nakagawa et al. |
| 10,101,681 B2 | 10/2018 | Tagawa et al. |
| 10,114,303 B2 | 10/2018 | Katsura et al. |
| 10,151,990 B2 | 12/2018 | Suzuki et al. |
| 10,156,800 B2 | 12/2018 | Tsuda et al. |
| 10,197,934 B2 | 2/2019 | Matsui et al. |
| 10,216,107 B2 | 2/2019 | Tsubaki et al. |
| 10,241,430 B2 | 3/2019 | Kimura et al. |
| 10,303,074 B2 | 5/2019 | Yamawaki et al. |
| 10,310,396 B2 | 6/2019 | Kamikura et al. |
| 10,338,487 B2 | 7/2019 | Kamikura et al. |
| 10,345,726 B2 | 7/2019 | Nakamura et al. |
| 10,353,308 B2 | 7/2019 | Hatakeyama et al. |
| 10,401,750 B2 | 9/2019 | Nakamura et al. |
| 10,409,180 B2 | 9/2019 | Koji et al. |
| 10,656,545 B2 | 5/2020 | Kamae et al. |
| 10,732,530 B2 * | 8/2020 | Matsui ............ G03G 9/08793 |
| 2004/0185367 A1 | 9/2004 | Serizawa et al. |
| 2007/0166636 A1 | 7/2007 | Daimon et al. |
| 2007/0212631 A1 | 9/2007 | Abe et al. |
| 2009/0087768 A1 | 4/2009 | Tosaka et al. |
| 2009/0197192 A1 | 8/2009 | Hiroko et al. |
| 2013/0202998 A1 | 8/2013 | Higashi et al. |
| 2014/0038098 A1 | 2/2014 | Naka et al. |
| 2014/0272699 A1 | 9/2014 | Minaki et al. |
| 2014/0308611 A1 | 10/2014 | Shimano et al. |
| 2015/0185658 A1 | 7/2015 | Wakabayashi et al. |
| 2017/0045834 A1 | 2/2017 | Shirai et al. |
| 2017/0269496 A1 | 9/2017 | Kubo et al. |
| 2018/0143557 A1 | 5/2018 | Ueda et al. |
| 2018/0329320 A1 | 11/2018 | Yoshida et al. |
| 2018/0329328 A1 | 11/2018 | Tanaka et al. |
| 2018/0329332 A1 | 11/2018 | Tominaga et al. |
| 2019/0049869 A1 | 2/2019 | Kamae et al. |
| 2019/0137900 A1 | 5/2019 | Nakagawa et al. |
| 2019/0137901 A1 | 5/2019 | Shimano et al. |
| 2019/0235403 A1 | 8/2019 | Tanaka et al. |
| 2019/0235404 A1 | 8/2019 | Kamikura et al. |
| 2019/0235407 A1 | 8/2019 | Nakamura et al. |
| 2019/0310564 A1 | 10/2019 | Koshima et al. |
| 2019/0384192 A1 | 12/2019 | Kagawa et al. |
| 2019/0384193 A1 | 12/2019 | Hashimoto et al. |
| 2019/0384194 A1 | 12/2019 | Yoshiba et al. |
| 2019/0384195 A1 | 12/2019 | Saeki et al. |
| 2019/0384197 A1 | 12/2019 | Aoki et al. |
| 2019/0384200 A1 | 12/2019 | Kamikura et al. |
| 2019/0384202 A1 | 12/2019 | Shiroyama et al. |
| 2020/0041922 A1 | 2/2020 | Shimano et al. |

FOREIGN PATENT DOCUMENTS

| | | |
|---|---|---|
| EP | 1 494 087 | 1/2005 |
| EP | 2 626 745 | 8/2013 |
| EP | 2 843 473 | 3/2015 |
| JP | H11-044967 | 2/1999 |
| JP | 2000-250264 | 9/2000 |
| JP | 2011-094137 | 5/2011 |
| JP | 2013-228724 | 11/2013 |
| JP | 2014-130243 | 7/2014 |
| JP | 2014-222259 | 11/2014 |
| WO | 2018/110593 | 6/2018 |

* cited by examiner

TONER AND METHOD FOR PRODUCING TONER

BACKGROUND OF THE INVENTION

Field of the Invention

The present invention relates to a toner able to be used in electrophotography methods, electrostatic recording methods, toner jet recording methods, and the like, and a method for producing the toner.

Description of the Related Art

Reducing energy consumption by electrophotographic devices has been considered a major technical issue in recent years, and investigations have been carried out into significant reducing the amount of heat emitted by fixing apparatuses. In toners in particular, there has been an increased need for so-called "low-temperature fixability", by which fixing can be achieved with less energy.

An example of a means for enabling fixing at a low temperature is to lower the glass transition temperature (Tg) of a binder resin in a toner. However, because lowering the Tg value leads to a decrease in the heat-resistant storage stability of a toner, it is thought that it is difficult to achieve a balance between low-temperature fixability and heat-resistant storage stability in a toner using this method.

As a result, a method comprising use of a crystalline vinyl resin as a binder resin has been investigated in order to achieve a balance between low-temperature fixability and heat-resistant storage stability in a toner. Amorphous resins commonly used as binder resins for toners do not give clear endothermic peaks in differential scanning calorimetry (DSC) measurements, but endothermic peaks are observed in DSC measurements in cases where crystalline resin components are contained.

Crystalline vinyl resins have properties such as hardly softening at temperatures up to the melting point due to side chains in molecules being aligned in a regular manner. In addition, crystals suddenly melt at the melting point, which causes a sudden decrease in viscosity. Therefore, attention has been focused on crystalline vinyl resins as materials which exhibit excellent sharp melt properties and achieve a balance between low-temperature fixability and heat-resistant storage stability.

Crystalline vinyl resins generally have long chain alkyl group side chains on a main chain skeleton, and exhibit crystalline properties as resins due to crystallization of long chain alkyl groups in side chains.

Japanese Patent Application Laid-open No. H11-44967 proposes a toner which uses a crystalline vinyl resin in which a crosslinked structure is introduced and which exhibits excellent low-temperature fixability.

Japanese Patent Application Laid-open No. 2014-130243 proposes a toner in which a crystalline vinyl resin, which is obtained by copolymerizing a polymerizable monomer having a long chain alkyl group and a polymerizable monomer that forms an amorphous segment, is used in a binder resin of a toner core. This configuration is intended to achieve a balance between low-temperature fixability and heat-resistant storage stability.

SUMMARY OF THE INVENTION

However, the binder resin used in the toner disclosed in Japanese Patent Application Laid-open No. H11-44967 is a crystalline vinyl resin obtained by copolymerizing only a crosslinking agent and a polymerizable monomer having a long chain alkyl group, and exhibits low elasticity at temperatures close to room temperature, and is therefore understood to exhibit poor durability.

In addition, it was understood that because this crystalline vinyl resin is likely to be crosslinked, low-temperature fixability decreases if an attempt is made to improve the bending resistance of a fixed image.

Meanwhile, the binder resin used in the toner disclosed in Japanese Patent Application Laid-open No. 2014-130243 has a high proportion of a structure derived from a polymerizable monomer having a long chain alkyl group, and exhibits low elasticity at temperatures close to room temperature, and is therefore understood to exhibit poor durability. In addition, it is understood that bending resistance of a fixed image is likely to decrease if printing is carried out at a high print percentage.

The present invention is a toner having excellent low-temperature fixability, heat-resistant storage stability, durability and bending resistance; and a method for producing the toner.

The present invention relates to:

a toner having a toner particle containing a binder resin, the toner being characterized in that the binder resin contains a polymer A, which is a polymer of a composition containing a first polymerizable monomer, a second polymerizable monomer that is different from the first polymerizable monomer, and a crosslinking agent, wherein the first polymerizable monomer is at least one monomer selected from the group consisting of (meth)acrylic acid esters having an alkyl group with 18 to 36 carbon atoms, the crosslinking agent has two or more polymerizable double bonds, a content of the first polymerizable monomer in the composition is 5.0 to 60.0 mol % based on the total number of moles of all polymerizable monomers and the crosslinking agent in the composition, a content of the second polymerizable monomer in the composition is 20.0 to 95.0 mol % based on the total number of moles of all polymerizable monomers and the crosslinking agent in the composition, and when the SP value of the first polymerizable monomer is denoted by $SP_{12}$ $(J/cm^3)^{0.5}$, the SP value of the second polymerizable monomer is denoted by $SP_{22}$ $(J/cm^3)^{0.5}$ and the SP value of the crosslinking agent is denoted by $SP_{C2}$ $(J/cm^3)^{0.5}$ formulae (1) and (2) below are satisfied.

$$0.60 \leq (SP_{22} - SP_{12}) \leq 15.00 \quad (1)$$

$$SP_{12} < SP_{C2} < (SP_{22} + 3.00) \quad (2)$$

In addition, the present invention relates to:

a method for producing a toner having a toner particle, the method for producing the toner being characterized by having a step of forming a particle of a polymerizable monomer composition containing polymerizable monomers in an aqueous medium, and a step of obtaining the toner particle, which contains polymer A obtained by polymerizing the polymerizable monomers contained in the particle, the polymerizable monomer composition containing:
a first polymerizable monomer,
a second polymerizable monomer that is different from the first polymerizable monomer, and a crosslinking agent, wherein
the first polymerizable monomer is at least one monomer selected from the group consisting of (meth)acrylic acid esters having an alkyl group with 18 to 36 carbon atoms,
the crosslinking agent has two or more polymerizable double bonds,
a content of the first polymerizable monomer in the polymerizable monomer composition is 5.0 to 60.0 mol % based on the total number of moles of all polymerizable monomers and the crosslinking agent in the polymerizable monomer composition,
a content of the second polymerizable monomer in the polymerizable monomer composition is 20.0 to 95.0 mol % based on the total number of moles of all polymerizable monomers and the crosslinking agent in the polymerizable monomer composition, and
when the SP value of the first polymerizable monomer is denoted by $SP_{12}$ $(J/cm^3)^{0.5}$, the SP value of the second polymerizable monomer is denoted by $SP_{22}$ $(J/cm^3)^{0.5}$ and the SP value of the crosslinking agent is denoted by $SP_{C2}$ $(J/cm^3)^{0.5}$, formulae (1) and (2) below are satisfied.

$$0.60 \le (SP_{22} - SP_{12}) \le 15.00 \qquad (1)$$

$$SP_{12} < SP_{C2} < (SP_{22} + 3.00) \qquad (2)$$

According to the present invention, it is possible to provide a toner having excellent low-temperature fixability, heat-resistant storage stability, durability and bending resistance. It is also possible to provide a method for producing the toner.

Further features of the present invention will become apparent from the following description of exemplary embodiments.

DESCRIPTION OF THE EMBODIMENTS

In the present invention, the terms "from XX to YY" and "XX to YY", which indicate numerical ranges, mean numerical ranges that include the lower limits and upper limits that are the end points of the ranges.

In the present invention, (meth)acrylic acid ester means an acrylic acid ester and/or a methacrylic acid ester.

In the present invention, "monomer unit" is taken to mean that one unit is a single carbon-carbon bond segment in a main chain of a polymer obtained by polymerizing a vinyl-based monomer. The vinyl-based monomer can be represented by formula (Z) below.

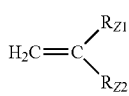

(Z)

In formula (Z), $R_{Z1}$ denotes a hydrogen atom or an alkyl group (preferably an alkyl group with 1 to 3 carbon atoms, and more preferably a methyl group), and $R_{Z2}$ denotes an arbitrary substituent group.

Crystalline resin means a resin that gives a clear endothermic peak in differential scanning calorimetry (DSC) measurements.

Crystalline vinyl resins generally have long chain alkyl group side chains on a main chain skeleton, and exhibit crystalline properties as resins due to crystallization of long chain alkyl groups in side chains.

Therefore, in cases where a crystalline vinyl resin having long chain alkyl groups is used, as the proportion of long chain alkyl groups increases, the degree of crystallinity increases, the melting point increases, sharp melt properties are exhibited, and excellent low-temperature fixability is achieved.

However, as the content of long chain alkyl groups increases, the elasticity of the crystalline vinyl resin decreases at temperatures close to room temperature. As a result, the toner becomes brittle and durability and bending resistance deteriorate.

Meanwhile, in cases where a polymerizable monomer having a long chain alkyl group and another polymerizable monomer are copolymerized and the content of long chain alkyl groups is lowered by a certain amount or more in order to improve durability and bending resistance, crystallinity significantly decreases and the melting point decreases. As a result, heat-resistant storage stability deteriorates, sharp melt properties decrease, and low-temperature fixability also deteriorates.

In addition, consideration will now be given to a case in which a polymerizable monomer having a long chain alkyl group and a crosslinking agent having two or more polymerizable double bonds are copolymerized and the thus obtained crystalline vinyl resin is imparted with elasticity. If an attempt is made to improve both durability and bending resistance simply by combining these two components, the crystallinity of the resin decreases and sharp melt properties decrease. As a result, low-temperature fixability deteriorates.

In order to solve these problems, the inventors of the present invention carried out investigations into types and quantities of polymerizable monomers having long chain alkyl groups in polymers used in binder resins, types and quantities of other polymerizable monomers, and differences in SP value between these polymerizable monomers. Furthermore, the inventors of the present invention carried out investigations into the relationship between SP values of polymerizable monomers having long chain alkyl groups, other polymerizable monomers and crosslinking agents, and thereby discovered the present invention.

The present invention relates to:
A toner having a toner particle containing a binder resin, the toner being characterized in that
the binder resin contains a polymer A, which is a polymer of a composition containing:
a first polymerizable monomer,
a second polymerizable monomer that is different from the first polymerizable monomer, and a crosslinking agent, wherein
the first polymerizable monomer is at least one monomer selected from the group consisting of (meth)acrylic acid esters having an alkyl group with 18 to 36 carbon atoms,
the crosslinking agent has two or more polymerizable double bonds,
a content of the first polymerizable monomer in the composition is 5.0 to 60.0 mol % based on the total number of moles of all polymerizable monomers and the crosslinking agent in the composition,
a content of the second polymerizable monomer in the composition is 20.0 to 95.0 mol % based on the total number of moles of all polymerizable monomers and the crosslinking agent in the composition, and
when the SP value of the first polymerizable monomer is denoted by $SP_{12}$ $(J/cm^3)^{0.5}$, the SP value of the second polymerizable monomer is denoted by $SP_{22}$ $(J/cm^3)^{0.5}$ and the SP value of the crosslinking agent is denoted by $SP_{C2}$ $(J/cm^3)^{0.5}$, formulae (1) and (2) below are satisfied.

$$0.60 \leq (SP_{22} - SP_{12}) \leq 15.00 \quad (1)$$

$$SP_{12} < SP_{C2} < (SP_{22} + 3.00) \quad (2)$$

In addition, the present invention relates to:
a method for producing a toner having a toner particle, the method for producing the toner being characterized by having
a step of forming a particle of a polymerizable monomer composition containing polymerizable monomers in an aqueous medium, and
a step of obtaining the toner particle, which contains polymer A obtained by polymerizing the polymerizable monomers contained in the particle,
the polymerizable monomer composition containing:
a first polymerizable monomer,
a second polymerizable monomer that is different from the first polymerizable monomer, and a crosslinking agent, wherein
the first polymerizable monomer is at least one monomer selected from the group consisting of (meth)acrylic acid esters having an alkyl group with 18 to 36 carbon atoms,
the crosslinking agent has two or more polymerizable double bonds,
a content of the first polymerizable monomer in the polymerizable monomer composition is 5.0 to 60.0 mol % based on the total number of moles of all polymerizable monomers and the crosslinking agent in the polymerizable monomer composition,
a content of the second polymerizable monomer in the polymerizable monomer composition is 20.0 to 95.0 mol % based on the total number of moles of all polymerizable monomers and the crosslinking agent in the polymerizable monomer composition, and
when the SP value of the first polymerizable monomer is denoted by $SP_{12}$ $(J/cm^3)^{0.5}$, the SP value of the second polymerizable monomer is denoted by $SP_{22}$ $(J/cm^3)^{0.5}$ and the SP value of the crosslinking agent is denoted by $SP_{C2}$ $(J/cm^3)^{0.5}$ formulae (1) and (2) below are satisfied.

$$0.60 \leq (SP_{22} - SP_{12}) \leq 15.00 \quad (1)$$

$$SP_{12} < SP_{C2} < (SP_{22} + 3.00) \quad (2)$$

Here, SP value is an abbreviation of solubility parameter (soluble parameter), and serves as an indicator of solubility. The calculation method is described later.

In the present invention, the binder resin contains a polymer A, which is a polymer of a composition containing a first polymerizable monomer, a second polymerizable monomer that is different from the first polymerizable monomer, and a crosslinking agent.

The first polymerizable monomer is at least one monomer selected from the group consisting of (meth)acrylic acid esters having an alkyl group with 18 to 36 carbon atoms, and
the crosslinking agent has two or more polymerizable double bonds.

The binder resin exhibits crystalline properties by containing polymer A, which is a polymer of the composition containing the first polymerizable monomer.

In addition, the binder resin has a crosslinked structure by containing a polymer A, which is a polymer of a composition containing a first polymerizable monomer, a second polymerizable monomer that is different from the first polymerizable monomer, and a crosslinking agent.

When the SP value of the first polymerizable monomer is denoted by $SP_{12}$ $(J/cm^3)^{0.5}$ and the SP value of the second polymerizable monomer is denoted by $SP_{22}$ $(J/cm^3)^{0.5}$, formula (1) below is satisfied.

$$0.60 \leq (SP_{22} - SP_{12}) \leq 15.00 \quad (1)$$

The value of $(SP_{22} - SP_{12})$ is preferably at least 2.00 $(J/m^3)^{0.5}$, and more preferably at least 3.00 $(J/m^3)^{0.5}$. In addition, the value of $(SP_{22} - SP_{12})$ is preferably not more than 10.00 $(J/m^3)^{0.5}$, and more preferably not more than 7.00 $(J/m^3)^{0.5}$ Moreover, these numerical ranges can be arbitrarily combined.

In the present invention, units for SP values are $(J/m^3)^{0.5}$, but these can be converted into units of $(cal/cm^3)^{0.5}$ because 1 $(cal/cm^3)^{0.5} = 2.045 \times 103$ $(J/m^3)^{0.5}$.

By satisfying formula (1), the melting point of the polymer A is maintained without causing a decrease in crystallinity. This configuration is intended to achieve a balance between low-temperature fixability and heat-resistant storage stability.

The reason for this is thought to be as follows. It is thought that by using a polymerizable monomer for which the value of $(SP_{22} - SP_{12})$ falls within the range of formula (1), the first polymerizable monomer and second polymerizable monomer do not undergo random polymerization when polymerized, but assume a polymer form that is continuous to a certain extent.

When the first polymerizable monomer is continuously polymerized to a certain extent, it is thought that the crystallinity of the obtained polymer can be increased and the melting point can be maintained.

The reason for this is thought to be because in cases where the value of $(SP_{22} - SP_{12})$ falls within the range of formula (1), polymer segments containing mainly first monomer units derived from the first polymerizable monomer in polymer A and polymer segments containing mainly second monomer units derived from the second polymerizable monomer can form a phase-separated state in micro-regions due to the difference in SP values.

As a result, it is thought that it is possible to obtain polymer segments in which the first polymerizable monomer is continuously polymerized to a certain extent, and it is possible to increase the crystallinity of these polymer segments, with the melting point being maintained.

That is, it is preferable for polymer A to have crystalline segments containing first monomer units derived from the first polymerizable monomer and amorphous segments containing second monomer units derived from the second polymerizable monomer.

In cases where the value of $(SP_{22} - SP_{12})$ is less than 0.60 $(J/cm^3)^{0.5}$, the melting point of the obtained polymer decreases and heat-resistant storage stability deteriorates. Meanwhile, in cases where the value of $(SP_{22} - SP_{12})$ exceeds 15.00 $(J/cm^3)^{0.5}$, it is thought that the copolymerizability of the polymer deteriorates, and heat-resistant storage stability, durability and bending resistance deteriorate.

Moreover, in cases where the first polymerizable monomer is at least two types of (meth)acrylic acid esters each having an alkyl group with 18 to 36 carbon atoms, the $SP_{12}$ value is an average value calculated from the molar proportions of each of the first polymerizable monomers. For example, in cases where polymerizable monomer A, whose SP value is denoted by $SP_{121}$, is contained at an amount of A mol % based on the number of moles of all polymerizable monomers that satisfy the requirements of the first polymerizable monomer and polymerizable monomer B, whose SP value is denoted by $SP_{122}$, is contained at an amount of (100−A) mol % based on the number of moles of all polymerizable monomers that satisfy the requirements of the first polymerizable monomer, the SP value ($SP_{12}$) is:

$$SP_{12} = (SP_{121} \times A + SP_{122} \times (100-A))/100$$

This calculation is performed in the same way in cases where at least three polymerizable monomers that satisfy the requirements of the first polymerizable monomer are contained.

Meanwhile, in cases where the second polymerizable monomer is at least two types of polymerizable monomer, $SP_{22}$ indicates the SP value of each polymerizable monomer, and the value of ($SP_{22} - SP_{12}$) is decided for each of the second polymerizable monomers.

In addition, when the SP value of the first polymerizable monomer is denoted by $SP_{12}$ $(J/cm^3)^{0.5}$, the SP value of the second polymerizable monomer is denoted by $SP_{22}$ $(J/cm^3)^{0.5}$ and the SP value of the crosslinking agent is denoted by $SP_{C2}$ $(J/cm^3)^{0.5}$, formula (2) below is satisfied.

$$SP_{12} < SP_{C2} < (SP_{22} + 3.00) \qquad (2)$$

Moreover, in formula (2), in cases where the first polymerizable monomer is at least two types of (meth)acrylic acid esters each having an alkyl group with 18 to 36 carbon atoms, the $SP_{12}$ value is an average value calculated from the molar proportions of each of the first polymerizable monomers.

In addition, in cases where the second polymerizable monomer is at least two types of polymerizable monomer, $SP_{22}$ indicates the SP value of each polymerizable monomer, and whether or not the formula ($SP_{C2} < SP_{22} + 3.00$) is satisfied is decided for each of the second polymerizable monomers. Moreover, in this case, the formula ($SP_{C2} < SP_{22} + 3.00$) being satisfied means that formula (2) is satisfied by all of the second polymerizable monomers.

Meanwhile, in cases where the crosslinking agent is at least two types of crosslinking agent, $SP_{C2}$ is an average value calculated from the molar proportions of the crosslinking agents.

By satisfying formula (2) above, it is possible to improve the elasticity of polymer A at normal temperatures (approximately 30° C.) and high temperatures (approximately 120° C.) without causing a decrease in sharp melt properties.

In this way, it is possible to improve durability and bending resistance without causing a deterioration in low-temperature fixability.

Bending resistance will now be explained. The following factors are essential for improving bending resistance.
(1) During fixing, the toner must bond to a medium such as a paper by melting and spreading to an appropriate degree.
(2) Following the fixing step, the medium must be released from a member such as a fixing film.
(3) Following the fixing, embrittlement resistance must be high when the temperature of the toner decreases to a normal temperature.

That is, high sharp melt properties, high elasticity at high temperatures and high elasticity at normal temperatures are required.

By satisfying formula (2), it is thought that the crosslinking agent is likely to be introduced into a polymer portion containing a second monomer unit derived from the second polymerizable monomer. Meanwhile, it is thought that the crosslinking agent is unlikely to be introduced into crystalline segments containing a first monomer unit derived from the first polymerizable monomer.

That is, in polymer A, a crosslinked structure is formed in polymer segments containing second monomer units derived from the second polymerizable monomer, but a crosslinked structure is unlikely to be formed in crystalline segments containing first monomer units derived from the first polymerizable monomer. Therefore, it is thought that elasticity at normal temperatures and high temperatures is increased because a crosslinked structure is formed in such a way that crystallinity is maintained, sharp melt properties are maintained, and a crosslinked structure is formed in segments other than crystalline segments.

Moreover, when the value of $SP_{C2}$ is greater than ($SP_{22}$ + 3.00), crosslinked structures are unlikely to be formed in polymer segments containing second monomer units derived from the second polymerizable monomer and elasticity at normal temperatures and high temperatures decreases.

When the SP value of a polymerizable monomer having the highest SP value among the first polymerizable monomers is denoted by $SP_{12max}$ $(J/cm^3)^{0.5}$, the SP value of a polymerizable monomer having the lowest SP value among the second polymerizable monomers is denoted by $SP_{22min}$ $(J/cm^3)^{0.5}$, and the SP value of the crosslinking agent is denoted by $SP_{C2}$ $(J/cm^3)^{0.5}$, it is preferable for $SP_{12max}$, $SP_{22min}$ and $SP_{C2}$ to satisfy formula (3) below.

$$(SP_{22min} - SP_{C2}) \leq (SP_{C2} - SP_{12max}) \qquad (3)$$

Moreover, in cases where one type of first polymerizable monomer and one type of second polymerizable monomer are used, the SP values of these polymerizable monomers are denoted by $SP_{12max}$ and $SP_{22min}$.

In addition, in cases where at least two types of crosslinking agent are used, $SP_{C2}$ is an average value calculated from the molar proportions of the crosslinking agents.

In cases where $SP_{12max}$, $SP_{22min}$ and $SP_{C2}$ satisfy formula (3), it is thought that the crosslinking agent can better crosslink the second polymerizable monomer, and that the first polymerizable monomer is less likely to be crosslinked. Therefore, it is possible to better improve durability and bending resistance without causing a deterioration in low-temperature fixability.

The crosslinking agent has at least two polymerizable double bonds, and is not particularly limited as long as formula (2) above is satisfied, but examples of the crosslinking agent are given below.

Polyethylene glycol di(meth)acrylate, polypropylene glycol di(meth)acrylate, poly(tetramethylene glycol) di(meth)acrylate, 1,6-hexane diol di(meth)acrylate, 1,9-nonane diol di(meth)acrylate, 1,10-decane diol di(meth)acrylate, neopentyl glycol di(meth)acrylate, divinylbenzene, divinylnaphthalene and both-terminal (meth)acrylic-modified silicones.

In addition, a long chain crosslinking agent represented by formula (4) is preferred as the crosslinking agent.

(4)

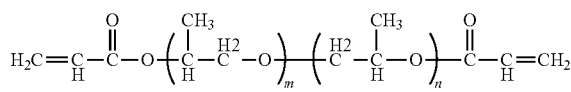

In formula (4), m and n are each independently an integer between 1 and 10, and the value of m+n is 2 to 16.

The molecular weight of the crosslinking agent is preferably at least 200, more preferably at least 300, and further preferably at least 500. In addition, the molecular weight is preferably not more than 1000. Moreover, these numerical ranges can be arbitrarily combined.

In cases where the molecular weight of the crosslinking agent is at least 200, the distance between crosslinking sites can be increased due to the high molecular weight. Therefore, even in cases where a crosslinked structure is formed in, for example, a crystalline segment containing a first monomer unit derived from the first polymerizable monomer, the degree of crystallinity is increased because formation of crystals derived from alkyl groups having 18 to 36 carbon atoms is unlikely to be hindered. Therefore, bending resistance is likely to be improved without impairing low-temperature fixability.

The content of the crosslinking agent in the composition is preferably 0.1 to 5.0 mol %, and more preferably 0.2 to 2.8 mol %, based on the total number of moles of all polymerizable monomers and crosslinking agents in the composition.

If the content of the crosslinking agent is at least 0.1 mol %, durability and bending resistance are more likely to be improved, and if the content of the crosslinking agent is not more than 5.0 mol %, low-temperature fixability is readily maintained, and if the content of the crosslinking agent is not more than 2.8 mol %, low-temperature fixability is more likely to be maintained.

The content of the first polymerizable monomer in the composition is 5.0 to 60.0 mol % based on the total number of moles of all polymerizable monomers and crosslinking agents in the composition, and the content of the second polymerizable monomer in the composition is 20.0 to 95.0 mol % based on the total number of moles of all polymerizable monomers and crosslinking agents in the composition.

The content of the first polymerizable monomer is preferably 10.0 to 60.0 mol %, and more preferably 20.0 to 40.0 mol %.

The content of the second polymerizable monomer is preferably 40.0 to 95.0 mol %, and more preferably 40.0 to 70.0 mol %.

In cases where the content of the first polymerizable monomer in the composition falls within the range mentioned above, it is possible to maintain normal temperature elasticity and high temperature elasticity of polymer A and improve sharp melt properties, and a toner having excellent low-temperature fixability, durability and bending resistance is formed.

If this content is less than 5.0 mol %, the amount of crystals in polymer A decreases and sharp melt properties decrease. This causes low-temperature fixability to deteriorate.

Meanwhile, if this content exceeds 60.0 mol %, normal temperature elasticity and high temperature elasticity deteriorate, and the durability and bending resistance of a toner deteriorate.

Moreover, in cases where the composition contains at least two types of (meth)acrylic acid ester each having an alkyl group with 18 to 36 carbon atoms, the content of the first polymerizable monomer is the total molar proportion of these monomers.

In cases where the content of the second polymerizable monomer in the composition falls within the range mentioned above, it is possible to maintain the sharp melt properties of polymer A and improve normal temperature elasticity and high temperature elasticity, and a toner having excellent low-temperature fixability, durability and bending resistance is formed. In addition, because crystallization of a composition containing the first polymerizable monomer in polymer A is unlikely to be hindered, the melting point can be maintained.

If this content is less than 20.0 mol %, normal temperature elasticity and high temperature elasticity of polymer A deteriorate, and the durability and bending resistance of a toner deteriorate.

Meanwhile, if this content exceeds 95.0 mol %, the sharp melt properties of polymer A deteriorate and low-temperature fixability deteriorates.

Moreover, in cases where at least two types of second polymerizable monomer that satisfy formula (1) are present, the content of the second polymerizable monomer is the total molar proportion of these monomers.

The first polymerizable monomer is at least one monomer selected from the group consisting of (meth)acrylic acid esters having an alkyl group with 18 to 36 carbon atoms.

Examples of (meth)acrylic acid esters having an alkyl group with 18 to 36 carbon atoms include (meth)acrylic acid esters having a straight chain alkyl group with 18 to 36 carbon atoms [stearyl (meth)acrylate, nonadecyl (meth)acrylate, eicosyl (meth)acrylate, heneicosyl (meth)acrylate, behenyl (meth)acrylate, lignoceryl (meth)acrylate, ceryl (meth)acrylate, octacosyl (meth)acrylate, myricyl (meth)acrylate, dotriacontyl (meth)acrylate, and the like] and (meth)acrylic acid esters having a branched chain alkyl group with 18 to 36 carbon atoms [2-decyltetradecyl (meth)acrylate, and the like].

Of these, at least one type selected from the group consisting of (meth)acrylic acid esters having a straight chain alkyl group with 18 to 36 carbon atoms is preferred from the perspectives of heat-resistant storage stability and low-temperature fixability of a toner. More preferably, the first polymerizable monomer is at least one type selected from the group consisting of (meth)acrylic acid esters having an alkyl group with 18 to 30 carbon atoms. Further preferably, the first polymerizable monomer is at least one type selected from the group consisting of straight chain stearyl methacrylate and behenyl (meth)acrylate.

The first polymerizable monomer may be a single monomer or a combination of two or more types.

Examples of the second polymerizable monomer include polymerizable monomers that satisfy formula (1) among the polymerizable monomers listed below.

The second polymerizable monomer may be a single monomer or a combination of two or more types.

Nitrile group-containing monomers; for example, acrylonitrile and methacrylonitrile.

Hydroxyl group-containing monomers; for example, 2-hydroxyethyl (meth)acrylate and 2-hydroxypropyl (meth)acrylate.

Amido group-containing monomers; for example, acrylamide, and monomers obtained by reacting an amine having 1 to 30 carbon atoms with a carboxylic acid having 2 to 30 carbon atoms and having an ethylenically unsaturated bond (acrylic acid, methacrylic acid, and the like) using a publicly known method.

Urethane group-containing monomers: for example, monomers obtained by reacting an alcohol having 2 to 22 carbon atoms and having an ethylenically unsaturated bond (2-hydroxyethyl methacrylate, vinyl alcohol, or the like) and an isocyanate having 1 to 30 carbon atoms [a monoisocyanate compound (benzenesulfonyl isocyanate, tosyl isocyanate, phenyl isocyanate, p-chlorophenyl isocyanate, butyl isocyanate, hexyl isocyanate, t-butyl isocyanate, cyclohexyl isocyanate, octyl isocyanate, 2-ethylhexyl isocyanate, dodecyl isocyanate, adamantyl isocyanate, 2,6-dimethylphenyl isocyanate, 3,5-dimethylphenyl isocyanate, 2,6-dipropylphenyl isocyanate, or the like), an aliphatic diisocyanate compound (trimethylene diisocyanate, tetramethylene diisocyanate, hexamethylene diisocyanate, pentamethylene diisocyanate, 1,2-propylene diisocyanate, 1,3-butylene diisocyanate, dodecamethylene diisocyanate, 2,4,4-trimethylhexamethylene diisocyanate, or the like), an alicyclic diisocyanate compound (1,3-cyclopentene diisocyanate, 1,3-cyclohexane diisocyanate, 1,4-cyclohexane diisocyanate, isophorone diisocyanate, hydrogenated diphenylmethane diisocyanate, hydrogenated xylylene diisocyanate, hydrogenated tolylene diisocyanate, hydrogenated tetramethylxylylene diisocyanate, or the like), or an aromatic diisocyanate compound (phenylene diisocyanate, 2,4-tolylene diisocyanate, 2,6-tolylene diisocyanate, 2,2'-diphenylmethane diisocyanate, 4,4'-diphenylmethane diisocyanate, 4,4'-toluidine diisocyanate, 4,4'-diphenyl ether diisocyanate, 4,4'-diphenyl diisocyanate, 1,5-naphthalene diisocyanate, xylylene diisocyanate, or the like)] using a publicly known method, and monomers obtained by reacting an alcohol having 1 to 26 carbon atoms (methanol, ethanol, propanol, isopropyl alcohol, butanol, t-butyl alcohol, pentanol, heptanol, octanol, 2-ethylhexanol, nonanol, decanol, undecyl alcohol, lauryl alcohol, dodecyl alcohol, myristyl alcohol, pentadecyl alcohol, cetanol, heptadecanol, stearyl alcohol, isostearyl alcohol, eicosyl alcohol, oleyl alcohol, linoleyl alcohol, linolenyl alcohol, nonadecyl alcohol, heneicosyl alcohol, behenyl alcohol, erucyl alcohol, or the like) and an isocyanate having 2 to 30 carbon atoms and having an ethylenically unsaturated bond [2-isocyanatoethyl (meth)acrylate, 2-(0-[1'-methylpropylidenamino]carboxyamino)ethyl (meth)acrylate, 2-[(3,5-dimethylpyrazolyl)carbonylamino]ethyl (meth)acrylate, 1,1-(bis(meth)acryloyloxymethyl)ethyl isocyanate, or the like] using a publicly known method, and the like.

Urea group-containing monomers: for example, monomers obtained by reacting an amine having 3 to 22 carbon atoms [a primary amine (n-butylamine, t-butylamine, propylamine, isopropylamine, or the like), a secondary amine (diethylamine, di-n-propylamine, di-n-butylamine, or the like), aniline, cyclohexylamine, or the like] and an isocyanate having 2 to 30 carbon atoms and having an ethylenically unsaturated bond using a publicly known method.

Carboxyl group-containing monomers: for example, methacrylic acid, acrylic acid and 2-carboxyethyl (meth) acrylate.

Of these, use of a monomer having a nitrile group, an amido group, a urethane group, a hydroxyl group or a urea group is preferred. More preferably, the second polymerizable monomer is a monomer having an ethylenically unsaturated bond and at least one type of functional group selected from the group consisting of a nitrile group, an amido group, a urethane group, a hydroxyl group or a urea group.

By using such a polymerizable monomer, the melting point of the polymer is likely to increase and heat-resistant storage stability is likely to improve. In addition, normal temperature elasticity and high temperature elasticity increase, and durability and bending resistance are likely to be improved.

Vinyl esters such as vinyl acetate, vinyl propionate, vinyl butyrate, vinyl caproate, vinyl caprylate, vinyl caprate, vinyl laurate, vinyl myristate, vinyl palmitate, vinyl stearate, vinyl pivalate and vinyl octanoate can be advantageously used as the second polymerizable monomer. Vinyl esters are non-conjugated monomers, and exhibit low reactivity with the first polymerizable monomer. As a result, it is thought that a state is likely to be formed whereby monomer units derived from the first polymerizable monomer in polymer A are gathered together and polymerized, the crystallinity of polymer A increases and a balance is likely to be achieved between low-temperature fixability and heat-resistant storage stability.

The second polymerizable monomer preferably has an ethylenically unsaturated bond, and more preferably has one ethylenically unsaturated bond.

In addition, the second polymerizable monomer is preferably at least one type selected from the group consisting of formulae (A) and (B) below.

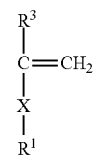

(A)

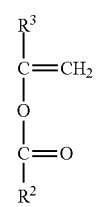

(B)

In formula (A),

X denotes a single bond or an alkylene group with 1 to 6 carbon atoms, $R^1$ denotes a nitrile group ($-C\equiv N$), an amido group ($-C(=O)NHR^{10}$, wherein $R^{10}$ is a hydrogen atom or an alkyl group with 1 to 4 carbon atoms), a hydroxyl group, $-COOR^{11}$ (wherein $R^{11}$ is an alkyl group with 1 to 6 (and preferably 1 to 4) carbon atoms or a hydroxyalkyl group with 1 to 6 (and preferably 1 to 4) carbon atoms), a urethane group ($-NHCOOR^{12}$, wherein $R^{12}$ is an alkyl group with 1 to 4 carbon atoms), a urea group ($-NH-C(=O)-N(R^{13})_2$, wherein $R^{13}$ groups are each independently a hydrogen atom or an alkyl group with 1 to 6 (and preferably 1 to 4) carbon atoms), $-COO(CH_2)_2NHCOOR^{14}$ (wherein $R^{14}$ is an alkyl group with 1 to 4 carbon atoms) or $-COO(CH_2)_2-NH-C(=O)-N(R^{15})_2$ (wherein $R^{15}$ groups are each independently a hydrogen atom or an alkyl group with 1 to 6 (and preferably 1 to 4) carbon atoms), and $R^3$ denotes a hydrogen atom or a methyl group, in formula (B), $R^2$ denotes an alkyl group with 1 to 4 carbon atoms, and $R^3$ denotes a hydrogen atom or a methyl group.

Preferably, in formula (A),

X denotes a single bond or an alkylene group with 1 to 6 carbon atoms, $R^1$ denotes a nitrile group ($-C\equiv N$), an amido group ($-C(=O)NHR^{10}$, wherein $R^{10}$ is a hydrogen atom or an alkyl group with 1 to 4 carbon atoms), a hydroxyl group, $-COOR^{11}$ (wherein $R^{11}$ is an alkyl group with 1 to 6 (and preferably 1 to 4) carbon atoms or a hydroxyalkyl group with 1 to 6 (and preferably 1 to 4) carbon atoms), a urea group (—NH—C(=O)—N($R^{13}$)$_2$, wherein $R^{13}$ groups are each independently a hydrogen atom or an alkyl group with 1 to 6 (and preferably 1 to 4) carbon atoms), —COO(CH$_2$)$_2$NHCOOR' (wherein $R^{14}$ is an alkyl group with 1 to 4 carbon atoms) or —COO(CH$_2$)$_2$—NH—C(=O)—N($R^{15}$)$_2$ (wherein $R^{15}$ groups are each independently a hydrogen atom or an alkyl group with 1 to 6 (and preferably 1 to 4) carbon atoms), and $R^3$ denotes a hydrogen atom or a methyl group, in formula (B), $R^2$ denotes an alkyl group with 1 to 4 carbon atoms, and $R^3$ denotes a hydrogen atom or a methyl group.

Polymer A is preferably a vinyl polymer. Examples of vinyl polymers include polymers of monomers that contain ethylenically unsaturated bonds. An ethylenically unsaturated bond is a carbon-carbon double bond capable of radical polymerization, and examples thereof include vinyl groups, propenyl groups, acryloyl groups and methacryloyl groups.

A composition containing a first polymerizable monomer, a second polymerizable monomer that is different from the first polymerizable monomer, and a crosslinking agent may contain a third polymerizable monomer that does not fall within the scope of formula (1) above (that is, is different from the first polymerizable monomer and the second polymerizable monomer) as long as the content of the first polymerizable monomer and the content of the second polymerizable monomer in the composition are not adversely affected.

Among monomers listed above as the second polymerizable monomer, monomers that do not satisfy formula (1) above can be used as the third polymerizable monomer.

In addition, the monomers listed below can also be used.

Styrene and derivatives thereof, such as styrene and o-methylstyrene, and (meth)acrylic acid esters, such as n-butyl (meth)acrylate, t-butyl (meth)acrylate and 2-ethylhexyl (meth)acrylate. Moreover, in cases where this monomer satisfies formula (1) above, the monomer can be used as the second polymerizable monomer.

In order to improve the storability of the toner, the third polymerizable monomer is preferably at least one type selected from the group consisting of styrene, methyl methacrylate and methyl acrylate.

From the perspective of maintaining crystallinity, the acid value of polymer A is preferably not more than 30.0 mg KOH/g, and more preferably not more than 20.0 mg KOH/g. If the acid value exceeds 30.0 mg KOH/g, crystallization of polymer A is likely to be hindered and a decrease in melting point may occur. Moreover, the acid value of polymer A is preferably at least 0 mg KOH/g.

The weight average molecular weight (Mw) of tetrahydrofuran (THF)-soluble matter in polymer A, as measured by means of gel permeation chromatography (GPC), is preferably 10,000 to 200,000, and more preferably 20,000 to 150,000.

If this weight average molecular weight (Mw) falls within the range mentioned above, elasticity at temperatures close to room temperature is likely to be maintained.

From the perspective of achieving a balance between low-temperature fixability and heat-resistant storage stability, the melting point of polymer A is preferably 50 to 80° C., and more preferably 53 to 70° C. In cases where this melting point falls within the range mentioned above, heat-resistant storage stability and low-temperature fixability are further improved.

This melting point can be controlled by adjusting the type and amount of the first polymerizable monomer being used, the type and amount of the second polymerizable monomer, and the like.

It is preferable for the content of polymer A in the binder resin to be at least 50.0 mass %.

If this content is at least 50.0 mass %, sharp melt properties of the toner are likely to be maintained and low-temperature fixability is further improved. This content is more preferably 80.0 to 100.0 mass %, and it is further preferable for the binder resin to be polymer A.

Examples of resins other than polymer A able to be used as the binder resin include conventional publicly known vinyl resins, polyester resins, polyurethane resins and epoxy resins. Of these, vinyl resins, polyester resins and polyurethane resins are preferred from the perspective of electrophotographic characteristics.

Polymerizable monomers able to be used in a vinyl resin include polymerizable monomers able to be used in the first polymerizable monomer, second polymerizable monomer and third polymerizable monomer mentioned above. If necessary, two or more of these polymerizable monomers may be used in combination.

A polyester resin can be obtained by means of a reaction between a dihydric or higher polycarboxylic acid and a polyhydric alcohol.

Examples of polycarboxylic acids include the compounds listed below.

Dibasic acids such as succinic acid, adipic acid, sebacic acid, phthalic acid, isophthalic acid, terephthalic acid, malonic acid and dodecenylsuccinic acid, and anhydrides and lower alkyl esters of these; aliphatic unsaturated dicarboxylic acids such as maleic acid, fumaric acid, itaconic acid and citraconic acid; and 1,2,4-benzenetricarboxylic acid and 1,2,5-benzenetricarboxylic acid, and anhydrides and lower alkyl esters of these. It is possible to use one of these polyhydric alcohols or a combination of two or more types thereof.

Examples of polyhydric alcohols include the compounds listed below.

Alkylene glycols (ethylene glycol, 1,2-propylene glycol and 1,3-propylene glycol); alkylene ether glycols (polyethylene glycol and polypropylene glycol); alicyclic diols (1,4-cyclohexanedimethanol); bisphenol compounds (bisphenol A); and alkylene oxide (ethylene oxide and propylene oxide) adducts of alicyclic diols. Alkyl moieties in alkylene glycols and alkylene ether glycols may be straight chain or branched chain. Other examples include glycerin, trimethylolethane, trimethylolpropane and pentaerythritol. It is possible to use one of these polyhydric alcohols or a combination of two or more types thereof.

Moreover, in order to adjust the acid value or hydroxyl value, monovalent acids such as acetic acid and benzoic acid and monohydric alcohols such as cyclohexanol and benzyl alcohol may be used if necessary.

The method for producing a polyester resin is not particularly limited, but it is possible to use, for example, a transesterification method or a direct polycondensation method, or a combination of these.

An explanation will now be given of a polyurethane resin. A polyurethane resin is a product of a reaction between a diol and a substance having a diisocyanate group, and resins having a variety of functions can be obtained by adjusting the diol and diisocyanate.

Examples of diisocyanate components include the following. Aromatic diisocyanates having from 6 to 20 carbon atoms (excluding carbon atoms in NCO groups, hereinafter also), aliphatic diisocyanates having from 2 to 18 carbon atoms, alicyclic diisocyanates having from 4 to 15 carbon atoms, modified products of these diisocyanates (modified products containing urethane groups, carbodiimide groups, allophanate groups, urea groups, biuret groups, uretdione groups, uretimine groups, isocyanurate groups or oxazolidone groups. Hereinafter referred to as "modified diisocyanates"), and mixtures of two or more types of these.

Examples of aromatic diisocyanates include the following. m- and/or p-xylylene diisocyanate (XDI) and $\alpha,\alpha,\alpha',\alpha'$-tetramethylxylylene diisocyanate.

In addition, examples of aliphatic diisocyanates include the following. Ethylene diisocyanate, tetramethylene diisocyanate, hexamethylene diisocyanate (HDI) and decamethylene diisocyanate.

In addition, examples of alicyclic diisocyanates include the following. Isophorone diisocyanate (IPDI), dicyclohexylmethane-4,4'-diisocyanate, cyclohexane diisocyanate and methylcyclohexane diisocyanate.

Of these, aromatic diisocyanates having from 6 to 15 carbon atoms, aliphatic diisocyanates having from 4 to 12 carbon atoms and alicyclic diisocyanates having from 4 to 15 carbon atoms are preferred, and XDI, IPDI and HDI are particularly preferred.

In addition to the diisocyanates mentioned above, it is possible to use a trifunctional or higher isocyanate compound.

Compounds similar to the dihydric alcohols able to be used in the polyester resin mentioned above can be used as diol components able to be used in the polyurethane resin.

The toner particle may contain a colorant. Examples of the colorant include publicly known organic pigments, organic dyes, inorganic pigments, carbon black as a black colorant and magnetic bodies. In addition, other colorants used in conventional toners may be used.

Examples of yellow colorants include the following.

Condensed azo compounds, isoindolinone compounds, anthraquinone compounds, azo metal complexes, methine compounds and allylamide compounds.

Specific examples include C.I. Pigment Yellow 12, 13, 14, 15, 17, 62, 74, 83, 93, 94, 95, 109, 110, 111, 128, 129, 147, 155, 168 and 180.

Examples of magenta colorants include the following.

Condensed azo compounds, diketopyrrolopyrrole compounds, anthraquinone compounds, quinacridone compounds, basic dye lake compounds, naphthol compounds, benzimidazolone compounds, thioindigo compounds and perylene compounds.

Specific examples include C.I. Pigment Red 2, 3, 5, 6, 7, 23, 48:2, 48:3, 48:4, 57:1, 81:1, 122, 144, 146, 166, 169, 177, 184, 185, 202, 206, 220, 221 and 254.

Examples of cyan colorants include the following.

Copper phthalocyanine compounds and derivatives thereof, anthraquinone compounds and basic dye lake compounds. Specific examples include C.I. Pigment Blue 1, 7, 15, 15:1, 15:2, 15:3, 15:4, 60, 62 and 66.

These colorants are selected in view of hue angle, chroma, lightness, lightfastness, OHP transparency and dispersibility in the toner particle.

The content of the colorant is preferably from 1.0 parts by mass to 20.0 parts by mass relative to 100.0 parts by mass of the binder resin. In cases where a magnetic body is used as a colorant, the content thereof is preferably from 40.0 parts by mass to 150.0 parts by mass relative to 100.0 parts by mass of the binder resin.

The toner particle may contain a wax (release agent). The type of wax is not particularly limited, and conventional publicly known waxes can be used.

Specifically, the following types of wax can be used.

Aliphatic hydrocarbon-based waxes such as low molecular weight polyethylene, low molecular weight polypropylene, polyolefin copolymers, polyolefin waxes, microcrystalline waxes, paraffin waxes and Fischer Tropsch waxes; oxidized aliphatic hydrocarbon-based waxes such as oxidized polyethylene waxes, and block copolymers of these; plant-based waxes such as candelilla wax, carnauba wax, Japan wax and jojoba wax; animal-based waxes such as beeswax, lanolin and spermaceti; mineral-based waxes such as ozokerite, ceresin and petroleum jelly; waxes comprising mainly aliphatic esters, such as montanic acid ester waxes and castor wax; and waxes obtained by partially or wholly deoxidizing aliphatic esters, such as deoxidized carnauba wax.

The content of wax in the toner particle is preferably from 1.0 mass % to 30.0 mass %, and more preferably from 2.0 mass % to 25.0 mass %.

The toner particle may, if necessary, contain a charge control agent. In addition, an external additive may be added to the toner particle. By blending a charge control agent, it is possible to stabilize charging characteristics and control the triboelectric charge quantity according to the developing system being used.

A publicly known charge control agent can be used, and a charge control agent which has a fast charging speed and can stably maintain a certain charge quantity is particularly preferred.

Organometallic compounds and chelate compounds are effective as charge control agents that impart a toner particle with negative charge characteristics, and examples thereof include monoazo metal compounds, acetylacetone metal compounds, aromatic oxycarboxylic acids, aromatic dicarboxylic acids, and oxycarboxylic acid-based and dicarboxylic acid-based metal compounds. Meanwhile, examples of charge control agents that impart a toner particle with positive charge characteristics include nigrosine, quaternary ammonium salts, metal salts of higher fatty acids, diorgano tin borate compounds, guanidine compounds and imidazole compounds.

The content of the charge control agent is preferably from 0.01 parts by mass to 20.0 parts by mass, and more preferably from 0.5 parts by mass to 10.0 parts by mass, relative to 100.0 parts by mass of the toner particle.

The toner particle may be used as-is as a toner, but it is also possible to obtain a toner by adding an external additive such as inorganic fine particles to the toner particle.

It is preferable for inorganic fine particles to be added to the toner particle. Examples of inorganic fine particles added to the toner particle include silica fine particles, titanium oxide fine particles, alumina fine particles and composite oxide fine particles of these. Among these inorganic fine particles, silica fine particles and titanium oxide fine particles are preferred from the perspectives of improved fluidity and uniform charging.

Examples of silica fine particles include dry silica or fumed silica produced by vapor phase oxidation of a silicon halide and wet silica produced from water glass. Of these dry silica, in which the amount of silanol groups at the surface and in the inner part of a silica fine particle is low and the amount of $Na_2O$ and $SO_3^{2-}$ is low, is preferred. In addition, dry silica may be composite fine particles of silica and another metal oxide, which are produced by using a metal halide such as aluminum chloride or titanium chloride together with the silicon halide in a production process.

In addition, by subjecting silica fine particles to a hydrophobic treatment, it is possible to adjust the charge quantity of a toner particle, improve environmental stability and improve characteristics in environments of high humidity, and use of hydrophobically treated silica fine particles is therefore more preferred. Hydrophobically treated silica fine particles prevent moisture absorption, maintain the charge quantity of a toner particle and improve developing performance and transferability.

Examples of treatment agents for hydrophobic treatment of silica fine particles include silicone oils, silane compounds, silane coupling agents, other organic silicon compounds and organic titanium compounds. It is possible to use one of these treatment agents or a combination of two or more types thereof.

Silicone oils are not particularly limited, and a publicly known silicone oil can be used, but straight silicones are particularly preferred.

Specific examples thereof include dimethylsilicone oils, alkyl-modified silicone oils, α-methylstyrene-modified silicone oils, fluorine-modified silicone oils and methylhydrogensilicone oils.

In addition, the viscosity of the silicone oil is preferably from 30 mm²/s to 1200 mm²/s, and more preferably from 70 mm²/s to 800 mm²/s.

A silicone oil treatment method may be a method comprising directly mixing silica fine particles and a silicone oil in a mixer such as a Henschel mixer or a method comprising stirring while spraying a silicone oil onto silica fine particles. In addition, it is possible to use a method comprising dissolving or dispersing a silicone oil in a suitable solvent (which is preferably adjusted to a pH of 4 using an organic acid or the like), mixing with silica fine particles, and then removing the solvent. Furthermore, it is possible to use a method comprising introducing silica fine particles into a reaction vessel, adding an alcohol-containing water while stirring in a nitrogen atmosphere, introducing a silicone oil-based treatment liquid into the reaction vessel so as to carry out a surface treatment, and then heating and stirring so as to remove the solvent.

The number average particle diameter of the primary particle of the silica fine particles is preferably from 5 nm to 20 nm. Within the range mentioned above, fluidity of the toner particle is likely to be improved.

The content of inorganic fine particles is preferably from 0.1 parts by mass to 4.0 parts by mass, and more preferably from 0.2 parts by mass to 3.5 parts by mass, relative to 100.0 parts by mass of the toner particle.

As long as the features of the present application are satisfied, the toner particle may be produced using any conventional publicly known method, such as a suspension polymerization method, an emulsion polymerization method, a dissolution suspension method or a pulverization method.

Of these, a suspension polymerization method is preferred because the first polymerizable monomer, the second polymerizable monomer that is different from the first polymerizable monomer and the crosslinking agent can be uniformly dispersed and crystallinity and durability are likely to be improved by controlling the toner particle to a spherical shape.

Specifically, the present invention relates to:

A method for producing a toner having a toner particle, the method for producing a toner being characterized by having a step of forming a particle of a polymerizable monomer composition containing polymerizable monomers in an aqueous medium, and a step of obtaining the toner particle, which contains polymer A obtained by polymerizing the polymerizable monomers contained in the particle, the polymerizable monomer composition containing:

a first polymerizable monomer, a second polymerizable monomer that is different from the first polymerizable monomer, and a crosslinking agent, wherein the first polymerizable monomer is at least one monomer selected from the group consisting of (meth)acrylic acid esters having an alkyl group with 18 to 36 carbon atoms, the crosslinking agent has two or more polymerizable double bonds, a content of the first polymerizable monomer in the polymerizable monomer composition is 5.0 to 60.0 mol % based on the total number of moles of all polymerizable monomers and the crosslinking agent in the polymerizable monomer composition, a content of the second polymerizable monomer in the polymerizable monomer composition is 20.0 to 95.0 mol % based on the total number of moles of all polymerizable monomers and the crosslinking agent in the polymerizable monomer composition, and when the SP value of the first polymerizable monomer is denoted by $SP_{12}$ $(J/cm^3)^{0.5}$, the SP value of the second polymerizable monomer is denoted by $SP_{22}$ $(J/cm^3)^{0.5}$ and the SP value of the crosslinking agent is denoted by $SP_{C2}$ $(J/cm^3)^{0.5}$ formulae (1) and (2) below are satisfied.

$$0.60 \leq (SP_{22}-SP_{12}) \leq 15.00 \quad (1)$$

$$SP_{12} < SP_{C2} < (SP_{22}+3.00) \quad (2)$$

For example, a polymerizable monomer composition is prepared by uniformly dissolving or dispersing a polymerizable monomer composition containing polymerizable monomers that generate a binder resin containing polymer A and, if necessary, a colorant, a wax, a charge control agent and other materials such as a polymerization initiator.

A particle of the polymerizable monomer composition is then prepared by dispersing the polymerizable monomer composition in an aqueous medium using a stirring device. A toner particle is then obtained by polymerizing the polymerizable monomers contained in the particle.

Following completion of the polymerization, the toner particle is filtered, washed and dried using publicly known methods, and an external additive is added if necessary, thereby obtaining a toner.

The polymerization initiator can be a publicly known polymerization initiator.

Examples thereof include azo-based and diazo-based polymerization initiators such as 2,2'-azobis-(2,4-dimethylvaleronitrile), 2,2'-azobisisobutyronitrile, 1,1'-azobis(cyclohexane-1-carbonitrile), 2,2'-azobis-4-methoxy-2,4-dimethylvaleronitrile and azobisisobutyronitrile; and peroxide-based polymerization initiators such as benzoyl peroxide, t-butylperoxy 2-ethylhexanoate, t-butylperoxy pivalate, t-butylperoxy isobutyrate, t-butylperoxy neodecanoate, methyl ethyl ketone peroxide, diisopropylperoxy carbonate, cumene hydroperoxide, 2,4-dichlorobenzoyl peroxide and lauroyl peroxide.

In addition, publicly known chain transfer agents and polymerization inhibitors may be used.

The aqueous medium may contain an inorganic or organic dispersion stabilizer.

The dispersion stabilizer can be a publicly known dispersion stabilizer.

Examples of inorganic dispersion stabilizers include phosphates such as hydroxyapatite, tribasic calcium phosphate, dibasic calcium phosphate, magnesium phosphate, aluminum phosphate and zinc phosphate; carbonates such as calcium carbonate and magnesium carbonate; metal hydroxides such as calcium hydroxide, magnesium hydroxide and aluminum hydroxide; sulfates such as calcium sulfate and barium sulfate; calcium metasilicate; bentonite; silica; and alumina.

Meanwhile, examples of organic dispersion stabilizers include poly(vinyl alcohol), gelatin, methyl cellulose, methylhydroxypropyl cellulose, ethyl cellulose, sodium carboxymethyl cellulose, poly(acrylic acid) and salts thereof, and starch.

In cases where an inorganic compound is used as a dispersion stabilizer, a commercially available product may be used as-is, but in order to obtain finer particles, it is possible to use a product obtained by dispersing an inorganic compound mentioned above in an aqueous medium.

For example, in the case of a calcium phosphate such as hydroxyapatite or tribasic calcium phosphate, an aqueous solution of a phosphate and an aqueous solution of a calcium salt should be mixed under high speed stirring.

The aqueous medium may contain a surfactant. The surfactant can be a publicly known surfactant. Examples of surfactants include anionic surfactants such as sodium dodecylbenzene sulfate and sodium oleate; cationic surfactants, amphoteric surfactants and non-ionic surfactants.

Descriptions will now be given of methods for measuring physical properties relating to the present invention.

Method for Measuring Content of Monomer Units Derived from Polymerizable Monomers in Polymer A The content of monomer units derived from polymerizable monomers in polymer A is measured by means of $^1$H-NMR under the following conditions.

Measurement apparatus: FT NMR apparatus JNM-EX400 (available from JEOL Ltd.)
Measurement frequency: 400 MHz
Pulse conditions: 5.0 μs
Frequency range: 10,500 Hz
Number of accumulations: 64
Measurement temperature: 30° C.
Sample: 50 mg of a measurement sample is placed in a sample tube having an internal diameter of 5 mm, deuterated chloroform ($CDCl_3$) is added as a solvent, and the measurement sample is dissolved in a constant temperature bath at 40° C.

From among peaks attributable to constituent elements of monomer units derived from the first polymerizable monomer in an obtained $^1$H-NMR chart, a peak that is independent from peaks attributable to constituent elements of monomer units derived from other monomers is selected, and the integrated value $S_1$ of this peak is calculated.

Similarly, from among peaks attributable to constituent elements of monomer units derived from the second polymerizable monomer, a peak that is independent from peaks attributable to constituent elements of monomer units derived from other monomers is selected, and the integrated value $S_2$ of this peak is calculated.

Furthermore, in cases where a third polymerizable monomer is used, from among peaks attributable to constituent elements of monomer units derived from the third polymerizable monomer, a peak that is independent from peaks attributable to constituent elements of monomer units derived from other monomers is selected, and the integrated value $S_3$ of this peak is calculated.

The content of monomer units derived from the first polymerizable monomer is calculated in the manner described below using the integrated values $S_1$, $S_2$ and $S_3$. Moreover, $n_1$, $n_2$ and $n_3$ denote the number of hydrogens in constituent elements attributable to peaks observed for the respective segments.

Content (mol %) of monomer units derived from first polymerizable monomer=$\{(S_1/n_1)/((S_1/n_1)+(S_2/n_2)+(S_3/n_3))\}\times 100$ Similarly, the content values of monomer units derived from the second polymerizable monomer and third polymerizable monomer are calculated in the manner described below.

Content (mol %) of monomer units derived from second polymerizable monomer=$\{(S_2/n_2)/((S_1/n_1)+(S_2/n_2)+(S_3/n_3))\}\times 100$ Content (mol %) of monomer units derived from third polymerizable monomer=$\{(S_3/n_3)/((S_1/n_1)+(S_2/n_2)+(S_3/n_3))\}\times 100$ Moreover, in cases where a polymerizable monomer in which a hydrogen atom is not contained in constituent elements other than vinyl groups is used in polymer A, $^{13}$C-NMR measurements are carried out in single pulse mode using $^{13}$C as a measurement atomic nucleus, and calculations are carried out in the same way as in 1H-NMR measurements.

In addition, in cases where a toner particle is produced using a suspension polymerization method, peaks attributable to waxes and other resins may overlap and independent peaks may not be observed. As a result, it may not be possible to calculate the content of monomer units derived from the polymerizable monomers in polymer A. In such cases, it is possible to produce a polymer A' by carrying out suspension polymerization in the same way, but without using waxes or other resins, and analyzing polymer A' in the same way as polymer A.

Method for Calculating SP Value

The values of $SP_{12}$, $SP_{22}$ and $SP_{C2}$ are determined in the manner described below in accordance with the calculation method proposed by Fedors.

For each of the polymerizable monomers, the evaporation energy ($\Delta ei$) (cal/mol) and molar volume ($\Delta vi$) ($cm^3$/mol) of atoms and atomic groups in the molecular structure are determined from tables shown in "Polym. Eng. Sci., 14(2), 147-154 (1974)", and $(4.184\times\Sigma\Delta ei/\Sigma\Delta vi)^{0.5}$ is taken to be the SP value ($J/cm^3)^{0.5}$.

Method for Measuring Melting Point

The melting point of polymer A is measured using a DSC Q1000 (available from TA Instruments) under the following conditions.

Temperature increase rate: 10° C./min
Measurement start temperature: 20° C.
Measurement end temperature: 180° C.

Temperature calibration of the detector in the apparatus is performed using the melting points of indium and zinc, and heat amount calibration is performed using the heat of fusion of indium.

Specifically, 5 mg of a sample is weighed out, placed in an aluminum pan, and subjected to differential scanning calorimetric measurements. An empty silver pan is used as a reference.

The melting point is taken to be the peak temperature of the maximum endothermic peak in a first temperature increase step.

Moreover, in cases where there are multiple peaks, the maximum endothermic peak is taken to be the peak for which the endothermic quantity is greatest.

Method for Measuring Acid Value

Acid value is the number of milligrams of potassium hydroxide required to neutralize acid contained in 1 g of a sample. In the present invention, the acid value of the polymer is measured in accordance with JIS K 0070-1992, but is specifically measured using the following procedure.

(1) Reagent Preparation

A phenolphthalein solution is obtained by dissolving 1.0 g of phenolphthalein in 90 mL of ethyl alcohol (95 vol. %) and adding ion exchanged water up to a volume of 100 mL.

7 g of special grade potassium hydroxide is dissolved in 5 mL of water, and ethyl alcohol (95 vol. %) is added up to a volume of 1 L. A potassium hydroxide solution is obtained by placing the obtained solution in an alkali-resistant container so as not to be in contact with carbon dioxide gas or the like, allowing solution to stand for 3 days, and then filtering.

The obtained potassium hydroxide solution is stored in the alkali-resistant container. The factor of the potassium hydroxide solution is determined by placing 25 mL of 0.1 mol/L hydrochloric acid in a conical flask, adding several drops of the phenolphthalein solution, titrating with the potassium hydroxide solution, and determining the factor from the amount of the potassium hydroxide solution required for neutralization. The 0.1 mol/L hydrochloric acid is produced in accordance with HS K 8001-1998.

(2) Operation (A) Main Test 2.0 g of a sample (for example, pulverized polymer A) is measured precisely into a 200 mL conical flask, 100 mL of a mixed toluene/ethanol (2:1) solution is added, and the sample is dissolved over a period of 5 hours.

Next, several drops of the phenolphthalein solution are added as an indicator, and titration is carried out using the potassium hydroxide solution. Moreover, the endpoint of the titration is deemed to be the point when the pale crimson color of the indicator is maintained for 30 seconds.

(B) Blank Test

Titration is carried out in the same way as in the operation described above, except that the sample is not used (that is, only a mixed toluene/ethanol (2:1) solution is used).

(3) The Acid Value is Calculated by Inputting the Obtained Results into the Formula Below.

$$A=[(C-B) \times f \times 5.61]/S$$

Here, A denotes the acid value (mg KOH/g), B denotes the added amount (mL) of the potassium hydroxide solution in the blank test, C denotes the added amount (mL) of the potassium hydroxide solution in the main test, f denotes the factor of the potassium hydroxide solution, and S denotes the mass (g) of the sample.

Method for Measuring Weight Average Molecular Weight (Mw) of Polymer a

The weight average molecular weight (Mw) of tetrahydrofuran (THF)-soluble matter in polymer A is measured by means of gel permeation chromatography (GPC), in the manner described below.

First, the sample is dissolved in tetrahydrofuran (THF) at room temperature over a period of 24 hours. A sample solution is then obtained by filtering the obtained solution using a solvent-resistant membrane filter having a pore diameter of 0.2 μm (a "Mishoridisk" available from Tosoh Corporation). Moreover, the sample solution is adjusted so that the concentration of THF-soluble components is 0.8 mass %. Measurements are carried out using this sample solution under the following conditions.

Apparatus: HLC8120 GPC (detector: RI) (available from Tosoh Corporation)
Column: seven columns of Shodex KF-801, 802, 803, 804, 805, 806 and 807 (available from Showa Denko Kabushiki Kaisha)
Eluant: tetrahydrofuran (THF)
Flow rate: 1.0 mL/min
Oven temperature: 40.0° C.
Injected amount: 0.10 mL When calculating the molecular weight of the sample, a molecular weight calibration curve is prepared using standard polystyrene resins (product names "TSK Standard Polystyrene F-850, F-450, F-288, F-128, F-80, F-40, F-20, F-10, F-4, F-2, F-1, A-5000, A-2500, A-1000 and A-500", available from Tosoh Corporation).

EXAMPLES

The present invention will now be explained in greater detail by means of the following working examples and comparative examples, but is in no way limited to these examples. Moreover, number of parts in the formulations below are on a mass basis unless explicitly stated otherwise.

Preparation of Urethane Group-Containing Monomer 50.0 parts of methanol was placed in a reaction vessel. 5.0 parts of Karenz MOI (2-isocyanatoethyl methacrylate, available from Showa Denko Kabushiki Kaisha) was then added dropwise under stirring at 40° C. Following completion of the dropwise addition, stirring was carried out for 2 hours while maintaining a temperature of 40° C. A urethane group-containing monomer was then prepared by removing unreacted methanol using an evaporator.

Preparation of Urea Group-Containing Monomer 50.0 parts of dibutylamine was placed in a reaction vessel. 5.0 parts of Karenz MOI (2-isocyanatoethyl methacrylate) was then added dropwise under stirring at room temperature. Following completion of the dropwise addition, stirring was carried out for 2 hours. A urea group-containing monomer was then prepared by removing unreacted dibutylamine using an evaporator.

Preparation of Polymer AO

In a nitrogen atmosphere, the materials listed below were placed in a reaction vessel equipped with a reflux condenser, a stirrer, a temperature gauge and a nitrogen inlet tube.

Toluene: 100.00 parts
Monomer composition: 100.00 parts
(The monomer composition is obtained by mixing behenyl acrylate, methacrylonitrile, styrene and polypropylene glycol diacrylate at the proportions shown below)
  Behenyl acrylate (first polymerizable monomer): 65.66 parts (28.7 mol %)
  Methacrylonitrile (second polymerizable monomer): 21.56 parts (53.5 mol %)
  Styrene (third polymerizable monomer): 10.78 parts (17.2 mol %)
  Polypropylene glycol diacrylate: 2.00 parts (0.6 mol %)
  (APG-400, available from Shin Nakamura Chemical Co., Ltd., molecular weight: 536)
t-butyl peroxypivalate: 0.50 parts
(Polymerization initiator, Perbutyl PV, available from NOF Corp.)

While being stirred at 200 rpm, the contents of the reaction vessel were heated to 70° C. and a polymerization reaction was carried out for 12 hours, thereby obtaining a solution in which a polymer of the monomer composition was dissolved in toluene. The temperature of the solution was then lowered to 25° C., and the solution was introduced into 1000.00 parts of methanol under stirring, thereby causing methanol-insoluble components to precipitate. The thus obtained methanol-insoluble components were filtered and washed with methanol, and then vacuum dried at 40° C. for 24 hours, thereby obtaining polymer AO. Polymer AO had an acid value of 0.0 mg KOH/g and a melting point of 62° C.

Preparation of Amorphous Resin

The following raw materials were placed in a heated and dried two-necked flask while introducing nitrogen.

Polyoxypropylene(2.2)-2,2-bis(4-hydroxyphenyl)propane: 30.00 parts
Polyoxyethylene(2.2)-2,2-bis(4-hydroxyphenyl)propane: 33.00 parts
Terephthalic acid: 21.00 parts
Dodecenylsuccinic acid: 15.00 parts
Dibutyltin oxide: 0.10 parts After purging the system with nitrogen by means of a depressurization procedure, stirring was carried out at 215° C. for 5 hours. The temperature was then slowly increased to 230° C. under reduced pressure while continuing the stirring, and this temperature was then maintained for 2 hours. When a viscous state was reached, the system was cooled and the reaction was terminated, thereby synthesizing an amorphous resin that was an amorphous polyester. The amorphous resin had a number average molecular weight (Mn) of 5200, a weight average molecular weight (Mw) of 23,000 and a glass transition temperature (Tg) of 55° C.

Preparation of Silica Fine Particles 1

10.0 parts of polydimethylsiloxane (viscosity 100 mm$^2$/s) was sprayed onto 100 parts of fumed silica (product name: Aerosil 380S, BET specific surface area: 380 m$^2$/g, number average primary particle diameter: 7 nm, available from Nippon Aerosil Co. Ltd.), and stirring was continued for 30 minutes. Silica fine particles 1 were then prepared by increasing the temperature to 300° C. while stirring and stirring for a further 2 hours.

Example 1

Production of Toner by Suspension Polymerization
Production of Toner Particle 1

A mixture comprising
Monomer composition: 100.00 parts
(The monomer composition is obtained by mixing behenyl acrylate, methacrylonitrile, styrene and polypropylene glycol diacrylate at the proportions shown below)

Behenyl acrylate (first polymerizable monomer): 65.66 parts (28.7 mol %)
Methacrylonitrile (second polymerizable monomer): 21.56 parts (53.5 mol %)
Styrene (third polymerizable monomer): 10.78 parts (17.2 mol %)
Polypropylene glycol diacrylate: 2.00 parts (0.6 mol %) (APG-400, available from Shin Nakamura Chemical Co., Ltd., molecular weight: 536)
Pigment Blue 15:3: 6.50 parts
Aluminum di-t-butylsalicylate: 1.00 parts
Fischer Tropsch wax: 20.00 parts (HNP-51, available from Nippon Seiro Co., Ltd., melting point: 74° C.)
Toluene: 100.00 parts was prepared. A raw material-dispersed solution was obtained by introducing the mixture into an attritor (available from Nippon Coke & Engineering Co., Ltd.) and dispersing for 2 hours at 200 rpm using zirconia beads having diameters of 5 mm.

Meanwhile, 735.00 parts of ion exchanged water and 16.00 parts of trisodium phosphate (dodecahydrate) were introduced into a vessel equipped with a high-speed stirrer homomixer (available from Primix Corporation) and a temperature gauge, and the temperature was increased to 60° C. while stirring at 12,000 rpm. Here, an aqueous solution of calcium chloride, which was obtained by dissolving 9.00 parts of calcium chloride (dihydrate) in 65.00 parts of ion exchanged water, was introduced into the vessel, and stirred for 30 minutes at 12,000 rpm while maintaining a temperature of 60° C. The pH was then adjusted to 6.0 by adding 10% hydrochloric acid, thereby obtaining an aqueous medium containing a dispersion stabilizer.

The raw material-dispersed solution was then transferred to a vessel equipped with a stirrer and a temperature gauge, and the temperature was increased to 60° C. while stirring at 100 rpm. 8.00 parts of t-butyl peroxypivalate (Perbutyl PV, available from NOF Corp.) was then added as a polymerization initiator, stirring was carried out for 5 minutes at 100 rpm while maintaining a temperature of 60° C., and the solution was then introduced into an aqueous medium being stirred at 12,000 rpm using the high-speed stirrer. A granulation solution was obtained by continuing the stirring for 20 minutes at 12,000 rpm using the high-speed stirrer while maintaining a temperature of 60° C.

The granulation solution was transferred to a reaction vessel equipped with a reflux condenser tube, a stirrer, a temperature gauge and a nitrogen inlet tube, and the temperature was increased to 70° C. while stirring at 150 rpm in a nitrogen atmosphere. A polymerization reaction was carried out for 10 hours while stirring at 150 rpm and maintaining a temperature of 70° C. A toner particle-dispersed solution was then obtained by removing the reflux condenser tube from the reaction vessel, increasing the temperature of the reaction liquid to 95° C., and removing toluene by stirring for 5 hours at 150 rpm while maintaining a temperature of 95° C.

The thus obtained toner particle-dispersed solution was cooled to 20° C. while being stirred at 150 rpm, after which dilute hydrochloric acid was added under stirring until the pH reached 1.5, thereby dissolving the dispersion stabilizer. Solid content was filtered off, thoroughly washed with ion exchanged water and then vacuum dried for 24 hours at 40° C., thereby obtaining toner particle 1, which contained a polymer A1 of the monomer composition.

In addition, a polymer A1' was obtained in the same way as in the method for producing toner particle 1, except that Pigment Blue 15:3, aluminum di-t-butylsalicylate and a Fischer Tropsch wax were not used. Polymer A1' had an acid value of 0.0 mg KOH/g and a melting point of 62° C.

Polymer A1 and polymer A1' were produced in a similar way, and were therefore assessed to have similar physical properties.

Preparation of Toner 1

The toner particle 1 was subjected to external addition. Toner 1 was obtained by dry mixing 100.0 parts of toner particle 1 and 1.8 parts of silica fine particle 1 for 5 minutes using a Henschel mixer (available from Mitsui Mining Co., Ltd.). Physical properties of the obtained toner 1 are shown in Table 2, and evaluation results are shown in Table 4.

TABLE 1

| Toner particle No. | Production method | First polymerizable monomer Type | First polymerizable monomer Parts by mass | Second polymerizable monomer Type | Second polymerizable monomer Parts by mass | Third polymerizable monomer Type | Third polymerizable monomer Parts by mass | Crosslinking agent Type | Crosslinking agent Parts by mass |
|---|---|---|---|---|---|---|---|---|---|
| 1 | A | BEA | 65.66 | MN | 21.56 | St | 10.78 | 1 | 2.00 |
| 2 | A | BEA | 39.20 | MN | 39.20 | St | 19.60 | 1 | 2.00 |
| 3 | A | BEA | 87.22 | MN | 10.78 | — | 0.00 | 1 | 2.00 |
| 4 | A | BEA | 59.78 | MN | 8.82 | St | 29.40 | 1 | 2.00 |
| 5 | A | BEA | 39.20 | MN | 58.80 | — | 0.00 | 1 | 2.00 |
| 6 | A | BEA | 33.32 | MN | 10.78 | St | 53.90 | 1 | 2.00 |
| 7 | A | BEA | 65.66 | AN | 21.56 | St | 10.78 | 1 | 2.00 |
| 8 | A | BEA | 49.00 | HPMA | 39.20 | St | 9.80 | 1 | 2.00 |
| 9 | A | BEA | 58.80 | VA | 29.40 | St | 9.80 | 1 | 2.00 |
| 10 | A | BEA | 58.80 | MA | 29.40 | St | 9.80 | 1 | 2.00 |
| 11 | A | BEA | 63.70 | AM | 24.50 | St | 9.80 | 1 | 2.00 |
| 12 | A | BEA | 59.78 | AA | 8.82 | MM | 29.40 | 1 | 2.00 |
| 13 | A | SA | 65.66 | MN | 21.56 | St | 10.78 | 1 | 2.00 |
| 14 | A | MYA | 65.66 | MN | 21.56 | St | 10.78 | 1 | 2.00 |
| 15 | A | OA | 65.66 | MN | 21.56 | St | 10.78 | 1 | 2.00 |
| 16 | A | BEA | 61.74 | MN / AA | 6.86 / 6.86 | St | 22.54 | 1 | 2.00 |
| 17 | A | BEA | 61.74 | MN / AA | 14.70 / 6.86 | St | 14.70 | 1 | 2.00 |
| 18 | A | BEA / SA | 46.06 / 19.60 | MN | 21.56 | St | 10.78 | 1 | 2.00 |
| 19 | A | BEA | 39.20 | AN / UT | 26.95 / 2.45 | St | 29.40 | 1 | 2.00 |
| 20 | A | BEA | 39.20 | AN / UR | 26.95 / 2.45 | St | 29.40 | 1 | 2.00 |
| 21 | A | BEA | 66.26 | MN | 21.76 | St | 10.88 | 2 | 1.10 |
| 22 | A | BEA | 66.26 | MN | 21.76 | St | 10.88 | 3 | 1.10 |
| 23 | A | BEA | 66.47 | MN | 21.82 | St | 10.91 | 4 | 0.80 |
| 24 | A | BEA | 64.32 | MN | 21.12 | St | 10.56 | 4 | 4.00 |
| 25 | A | BEA | 66.86 | MN | 21.96 | St | 10.98 | 4 | 0.20 |
| 26 | B | BEA | 65.66 | MN | 21.56 | St | 10.78 | 1 | 2.00 |
| 27 | C | BEA | 65.66 | MN | 21.56 | St | 10.78 | 1 | 2.00 |
| 28 | B | BEA | 65.66 | MN | 21.56 | St | 10.78 | 1 | 2.00 |
| 29 | B | BEA | 65.66 | MN | 21.56 | St | 10.78 | 1 | 2.00 |
| 30 | B | BEA | 65.66 | MN | 21.56 | St | 10.78 | 1 | 2.00 |
| 31 | A | BEA / BEMA | 32.34 / 33.32 | MN | 21.56 | St | 10.78 | 1 | 2.00 |
| 32 | A | BEA | 24.50 | VA | 73.50 | — | 0.00 | 1 | 2.00 |
| Comp. 1 | A | BEA | 65.87 | AA | 4.75 | MM | 28.28 | 3 | 1.10 |
| Comp. 2 | A | BEA | 89.01 | MN | 9.89 | — | — | 3 | 1.10 |
| Comp. 3 | A | BEA | 60.33 | MN | 6.92 | St | 31.65 | 3 | 1.10 |
| Comp. 4 | A | HA | 60.33 | MN | 25.71 | St | 12.86 | 3 | 1.10 |
| Comp. 5 | A | BEA | 59.34 | — | — | MM / St | 28.68 / 10.88 | 3 | 1.10 |
| Comp. 6 | A | BEA | 66.67 | MN | 21.89 | St | 10.94 | 5 | 0.50 |
| Comp. 7 | A | BEA | 69.96 | AN | 29.98 | — | — | 5 | 0.06 |
| Comp. 8 | A | BEA | 67.00 | MN | 22.00 | St | 11.00 | — | — |

Abbreviations used in the tables are as follows.
BEA: behenyl acrylate
BEMA: behenyl methacrylate
SA: stearyl acrylate
MYA: myricyl acrylate
OA: octacosyl acrylate
HA: hexadecyl acrylate
MN: methacrylonitrile
AN: acrylonitrile
HPMA: 2-hydroxypropyl methacrylate
AM: acrylamide
UT: urethane group-containing monomer
UR: urea group-containing monomer
AA: acrylic acid
VA: vinyl acetate
MA: methyl acrylate
ST: styrene
MM: methyl methacrylate
In the crosslinking agent column in the table,
1: polypropylene glycol diacrylate
2: tripropylene glycol diacrylate
3: 1,10-decane diol diacrylate
4: 1,6-hexane diol diacrylate
5: divinylbenzene In addition, in the production method column in the table, A denotes a suspension polymerization method, B denotes an emulsion aggregation method, and C denotes a pulverization method.

In addition, in the crosslinking agent column in the table, the tripropylene glycol diacrylate is APG-200 available from Shin Nakamura Chemical Co., Ltd., which has a molecular weight of 300.

TABLE 2-1

| Toner No. | Toner particle No. | First polymerizable monomer | | | Second polymerizable monomer | | | Third polymerizable monomer | | | Crosslinking agent | | | |
|---|---|---|---|---|---|---|---|---|---|---|---|---|---|---|
| | | Type | $SP_{12}$ | Molar proportion mol % | Type | $SP_{22}$ | Molar proportion mol % | Type | $SP_{22}$ | Molar proportion mol % | Type | $SP_{C2}$ | Molecular weight | Molar proportion mol % |
| Example1 | 1 | 1 | BEA | 17.69 | 28.7 | MN | 21.97 | 53.5 | St | 17.2 | 1 | 20.56 | 536 | 0.6 |
| Example2 | 2 | 2 | BEA | 17.69 | 11.7 | MN | 21.97 | 66.5 | St | 21.4 | 1 | 20.56 | 536 | 0.4 |
| Example3 | 3 | 3 | BEA | 17.69 | 58.2 | MN | 21.97 | 40.8 | — | — | 1 | 20.56 | 536 | 1.0 |
| Example4 | 4 | 4 | BEA | 17.69 | 27.3 | MN | 21.97 | 22.9 | St | 49.2 | 1 | 20.56 | 536 | 0.6 |
| Example5 | 5 | 5 | BEA | 17.69 | 10.5 | MN | 21.97 | 89.1 | — | — | 1 | 20.56 | 536 | 0.4 |
| Example6 | 6 | 6 | BEA | 17.69 | 11.4 | MN | 21.97 | 20.9 | St | 67.2 | 1 | 20.56 | 536 | 0.5 |
| Example7 | 7 | 7 | BEA | 17.69 | 25.1 | AN | 22.75 | 59.3 | St | 15.1 | 1 | 20.56 | 536 | 0.5 |
| Example8 | 8 | 8 | BEA | 17.69 | 25.8 | HPMA | 22.05 | 54.6 | St | 18.9 | 1 | 20.56 | 536 | 0.7 |
| Example9 | 9 | 9 | BEA | 17.69 | 26.0 | VA | 18.31 | 57.6 | St | 15.8 | 1 | 20.56 | 536 | 0.6 |
| Example10 | 10 | 10 | BEA | 17.69 | 26.0 | MA | 18.31 | 57.6 | St | 15.8 | 1 | 20.56 | 536 | 0.6 |
| Example11 | 11 | 11 | BEA | 17.69 | 27.4 | AM | 29.13 | 56.6 | St | 15.4 | 1 | 20.56 | 536 | 0.6 |
| Example12 | 12 | 12 | BEA | 17.69 | 27.2 | AA | 22.66 | 21.2 | MM | 50.9 | 1 | 20.56 | 536 | 0.7 |
| Example13 | 13 | 13 | SA | 17.71 | 32.1 | MN | 21.97 | 50.9 | St | 16.4 | 1 | 20.56 | 536 | 0.6 |
| Example14 | 14 | 14 | MYA | 17.65 | 23.7 | MN | 21.97 | 57.2 | St | 18.4 | 1 | 20.56 | 536 | 0.7 |
| Example15 | 15 | 15 | OA | 17.65 | 24.8 | MN | 21.97 | 56.3 | St | 18.2 | 1 | 20.56 | 536 | 0.7 |
| Example16 | 16 | 16 | BEA | 17.69 | 28.0 | MN | 21.97 | 17.6 | St | 37.4 | 1 | 20.56 | 536 | 0.6 |
| | | | | | AA | 22.66 | 16.4 | | | 1 | | | | |
| Example17 | 17 | 17 | BEA | 17.69 | 26.1 | MN | 21.97 | 35.3 | St | 22.7 | 1 | 20.56 | 536 | 0.6 |
| | | | | | AA | 22.66 | 15.3 | | | 1 | | | | |
| Example18 | 18 | 18 | BEA | 17.70 | 19.8 | MN | 21.97 | 52.7 | St | 17.0 | 1 | 20.56 | 536 | 0.6 |
| | | SA | | 9.9 | | | | | | 1 | | | | |
| Example19 | 19 | 19 | BEA | 17.69 | 11.3 | AN | 22.75 | 55.9 | St | 31.0 | 1 | 20.56 | 536 | 0.4 |
| | | | | | UT | 21.91 | 1.4 | | | 1 | | | | |
| Example20 | 20 | 20 | BEA | 17.69 | 11.4 | AN | 22.75 | 56.0 | St | 31.2 | 1 | 20.56 | 536 | 0.4 |
| | | | | | UR | 20.86 | 1.0 | | | 1 | | | | |
| Example21 | 21 | 21 | BEA | 17.69 | 28.7 | MN | 21.97 | 53.5 | St | 17.2 | 2 | 21.21 | 300 | 0.6 |
| Example22 | 22 | 22 | BEA | 17.69 | 28.7 | MN | 21.97 | 53.5 | St | 17.2 | 3 | 19.68 | 282 | 0.6 |
| Example23 | 23 | 23 | BEA | 17.69 | 28.7 | MN | 21.97 | 53.5 | St | 17.2 | 4 | 20.23 | 226 | 0.6 |
| Example24 | 24 | 24 | BEA | 17.69 | 28.0 | MN | 21.97 | 52.2 | St | 16.8 | 4 | 20.23 | 226 | 3.0 |
| Example25 | 25 | 25 | BEA | 17.69 | 28.8 | MN | 21.97 | 53.7 | St | 17.3 | 4 | 20.23 | 226 | 0.2 |
| Example26 | 26 | 26 | BEA | 17.69 | 28.7 | MN | 21.97 | 53.5 | St | 17.2 | 1 | 20.56 | 536 | 0.6 |
| Example27 | 27 | 27 | BEA | 17.69 | 28.7 | MN | 21.97 | 53.5 | St | 17.2 | 1 | 20.56 | 536 | 0.6 |
| Example28 | 28 | 28 | BEA | 17.69 | 28.7 | MN | 21.97 | 53.5 | St | 17.2 | 1 | 20.56 | 536 | 0.6 |
| Example29 | 29 | 29 | BEA | 17.69 | 28.7 | MN | 21.97 | 53.5 | St | 17.2 | 1 | 20.56 | 536 | 0.6 |
| Example30 | 30 | 30 | BEA | 17.69 | 28.7 | MN | 21.97 | 53.5 | St | 17.2 | 1 | 20.56 | 536 | 0.6 |
| Example31 | 31 | 31 | BEA | 17.65 | 14.2 | MN | 21.97 | 53.9 | St | 17.3 | 1 | 20.56 | 536 | 0.6 |
| | | BEMA | | 14.0 | | | | | | 1 | | | | |
| Example32 | 32 | 32 | BEA | 17.69 | 7.0 | VA | 18.31 | 92.6 | — | — | 1 | 20.56 | 536 | 0.4 |
| Comp. example1 | Comp. 1 | Comp. 1 | BEA | 17.69 | 32.9 | AA | 22.66 | 12.6 | MM | 53.8 | 3 | 19.68 | 282 | 0.7 |
| Comp. example2 | Comp. 2 | Comp. 2 | BEA | 17.69 | 60.7 | MN | 21.97 | 38.3 | — | — | 3 | 19.68 | 282 | 1.0 |
| Comp. example3 | Comp. 3 | Comp. 3 | BEA | 17.69 | 27.8 | MN | 21.97 | 18.1 | St | 53.4 | 3 | 19.68 | 282 | 0.7 |
| Comp. example4 | Comp. 4 | Comp. 4 | HA | 17.73 | 28.5 | MN | 21.97 | 53.7 | St | 17.3 | 3 | 19.68 | 282 | 0.5 |
| Comp. example5 | Comp. 5 | Comp. 5 | BEA | 17.69 | 28.3 | — | — | — | MM | 52.0 | 3 | 19.68 | 282 | 0.7 |
| | | | | | | | | St | 19.0 | | | | | |
| Comp. example6 | Comp. 6 | Comp. 6 | BEA | 17.69 | 28.7 | MN | 21.97 | 53.5 | St | 17.2 | 5 | 17.13 | 130 | 0.6 |
| Comp. example7 | Comp. 7 | Comp. 7 | BEA | 17.69 | 24.5 | AN | 22.75 | 75.4 | — | — | 5 | 17.13 | 130 | 0.1 |
| Comp. example8 | Comp. 8 | Comp. 8 | BEA | 17.69 | 28.9 | MN | 21.97 | 53.8 | St | 17.3 | — | — | — | — |

TABLE 2-2

| Toner No. | Toner particle No. | $SP_{22} - SP_{12}$ | $SP_{22min} - SP_{C2}$ | Inequality | $SP_{C2} - SP_{12max}$ | X | Tm ° C. |
|---|---|---|---|---|---|---|---|
| Example1 | 1 | 1 | 4.28 | 1.41 | < | 2.87 | 100 | 62 |
| Example2 | 2 | 2 | 4.28 | 1.41 | < | 2.87 | 100 | 55 |

TABLE 2-2-continued

| Toner No. | Toner particle No. | $SP_{22} - SP_{12}$ | $SP_{22min} - SP_{C2}$ | Inequality | $SP_{C2} - SP_{12max}$ | X | Tm °C. |
|---|---|---|---|---|---|---|---|
| Example3 | 3 | 3 | 4.28 | 1.41 | < | 2.87 | 100 | 62 |
| Example4 | 4 | 4 | 4.28 | 1.41 | < | 2.87 | 100 | 57 |
| Example5 | 5 | 5 | 4.28 | 1.41 | < | 2.87 | 100 | 56 |
| Example6 | 6 | 6 | 4.28 | 1.41 | < | 2.87 | 100 | 53 |
| Example7 | 7 | 7 | 5.05 | 2.19 | < | 2.87 | 100 | 62 |
| Example8 | 8 | 8 | 4.36 | 1.49 | < | 2.87 | 100 | 59 |
| Example9 | 9 | 9 | 0.61 | −2.25 | < | 2.87 | 100 | 56 |
| Example10 | 10 | 10 | 0.61 | −2.25 | < | 2.87 | 100 | 54 |
| Example11 | 11 | 11 | 11.43 | 8.57 | > | 2.87 | 100 | 59 |
| Example12 | 12 | 12 | 4.97 | 2.10 | < | 2.87 | 100 | 57 |
| Example13 | 13 | 13 | 4.25 | 1.41 | < | 2.85 | 100 | 54 |
| Example14 | 14 | 14 | 4.32 | 1.41 | < | 2.91 | 100 | 76 |
| Example15 | 15 | 15 | 4.32 | 1.41 | < | 2.91 | 100 | 78 |
| Example16 | 16 | 16 | 4.28 4.97 | 1.41 | < | 2.87 | 100 | 58 |
| Example17 | 17 | 17 | 4.28 4.97 | 1.41 | < | 2.87 | 100 | 61 |
| Example18 | 18 | 18 | 4.27 | 1.41 | < | 2.85 | 100 | 58 |
| Example19 | 19 | 19 | 5.05 4.21 | 1.35 | < | 2.87 | 100 | 55 |
| Example20 | 20 | 20 | 5.05 3.17 | 0.30 | < | 2.87 | 100 | 55 |
| Example21 | 21 | 21 | 4.28 | 0.76 | < | 3.52 | 100 | 61 |
| Example22 | 22 | 22 | 4.28 | 2.29 | > | 1.99 | 100 | 62 |
| Example23 | 23 | 23 | 4.28 | 1.74 | < | 2.54 | 100 | 62 |
| Example24 | 24 | 24 | 4.28 | 1.74 | < | 2.54 | 100 | 62 |
| Example25 | 25 | 25 | 4.28 | 1.74 | < | 2.54 | 100 | 62 |
| Example26 | 26 | 26 | 4.28 | 1.41 | < | 2.87 | 100 | 62 |
| Example27 | 27 | 27 | 4.28 | 1.41 | < | 2.87 | 100 | 62 |
| Example28 | 28 | 28 | 4.28 | 1.41 | < | 2.87 | 82 | 62 |
| Example29 | 29 | 29 | 4.28 | 1.41 | < | 2.87 | 52 | 62 |
| Example30 | 30 | 30 | 4.28 | 1.41 | < | 2.87 | 48 | 62 |
| Example31 | 31 | 31 | 4.32 | 1.41 | < | 2.87 | 100 | 62 |
| Example32 | 32 | 32 | 0.61 | −2.25 | < | 2.87 | 100 | 55 |
| Comp. example1 | Comp. 1 | Comp. 1 | 4.97 | 2.98 | > | 1.99 | 100 | 56 |
| Comp. example2 | Comp. 2 | Comp. 2 | 4.28 | 2.29 | > | 1.99 | 100 | 62 |
| Comp. example3 | Comp. 3 | Comp. 3 | 4.28 | 2.29 | > | 1.99 | 100 | 56 |
| Comp. example4 | Comp. 4 | Comp. 4 | 4.23 | 2.29 | > | 1.95 | 100 | 45 |
| Comp. example5 | Comp. 5 | Comp. 5 | — | — | — | — | 100 | 52 |
| Comp. example6 | Comp. 6 | Comp. 6 | 4.28 | 4.84 | > | −0.56 | 100 | 62 |
| Comp. example7 | Comp. 7 | Comp. 7 | 5.05 | 5.62 | > | −0.56 | 100 | 61 |
| Comp. example8 | Comp. 8 | Comp. 8 | 4.28 | — | — | — | 100 | 62 |

In the table, X denotes the content (mass %) of polymer A in the binder resin, and Tm denotes the melting point (° C.) of polymer A.

Examples 2 to 25, 31 and 32

Toner particles 2 to 25, 31 and 32 were obtained in the same way as in Example 1, except that the type and added amount of polymerizable monomer composition used were altered in the manner shown in Table 1.

Furthermore, toners 2 to 25, 31 and 32 were obtained by carrying out a silica fine particle external addition step similar to that carried out in Example 1. Physical properties of the obtained toners 2 to 25, 31 and 32 are shown in Table 2, and evaluation results are shown in Table 4.

Example 26

Production of Toner by Emulsion Aggregation
Preparation of Polymer-Dispersed Solution Monomer composition: 100.00 parts
(The monomer composition is obtained by mixing behenyl acrylate, methacrylonitrile and styrene at the proportions shown below)

Behenyl acrylate (first polymerizable monomer): 65.66 parts (28.7 mol %)

Methacrylonitrile (second polymerizable monomer): 21.56 parts (53.5 mol %)

Styrene (third polymerizable monomer): 10.78 parts (17.2 mol %)

A monomer solution was prepared by mixing the components mentioned above, an aqueous surfactant solution, which was obtained by dissolving 10 parts of an anionic surfactant (Neogen RK available from Dai-ichi Kogyo Seiyaku Co., Ltd.) in 1130 parts of ion exchanged water, and the monomer solution were placed in two-necked flask, and emulsification was carried out by stirring at 10,000 r/min using a homogenizer (Ultratarax T50 available from IKA).

Next, the flask was purged with nitrogen, the contents of the flask were heated to 70° C. in a water bath while slowly stirring the contents, 7 parts of ion exchanged water, in which was dissolved 2.00 parts of polypropylene glycol diacrylate (APG-400 available from Shin Nakamura Chemical Co., Ltd., molecular weight: 536), was introduced, and polymerization was initiated.

After continuing the reaction for 8 hours, the reaction liquid was cooled to room temperature, and the concentration of the reaction liquid was adjusted with ion exchanged water, thereby obtaining an aqueous dispersion in which the concentration of polymer fine particle 1 was 20 mass % (polymer fine particle 1-dispersed solution).

The 50% particle diameter on a volume basis (D50) of the polymer fine particle 1 was measured using a dynamic light scattering particle size distribution analyzer (Nanotrac UPA-EX150 available from Nikkiso Co., Ltd.), and found to be 0.40 μm.

Preparation of wax-dispersed solution 1
Fischer Tropsch wax: 100.00 parts
(HNP-51, available from Nippon Seiro Co., Ltd., melting point: 74° C.)
Anionic surfactant (Neogen RK available from Dai-ichi Kogyo Seiyaku Co., Ltd.): 5.00 parts
Ion exchanged water: 395.00 parts The materials listed above were weighed out and placed in a mixing vessel equipped with a stirring device, heated to 90° C. and subjected to dispersion treatment for 60 minutes by being circulated in a Clearmix W-Motion (available from M Technique Co., Ltd.). The dispersion treatment conditions were as follows.

Outer diameter of rotor: 3 cm
Clearance: 0.3 mm
Rotational speed of rotor: 19,000 rpm
Rotational speed of screen: 19,000 rpm Following the dispersion treatment, a wax-dispersed solution 1 in which the concentration of wax fine particle 1 was 20 mass % was obtained by cooling to 40° C. at a rotor rotational speed of 1000 rpm, a screen rotational speed of 0 rpm and a cooling rate of 10° C./min.

The 50% particle diameter on a volume basis (D50) of the wax fine particle 1 was measured using a dynamic light scattering particle size distribution analyzer (Nanotrac UPA-EX150 available from Nikkiso Co., Ltd.), and found to be 0.15 μm.

Preparation of Colorant-dispersed Solution 1
Colorant: 50.00 parts
(Cyan pigment, Pigment Blue 15:3 available from Dainichiseika Color and Chemicals Mfg. Co., Ltd.)
Anionic surfactant (Neogen RK available from Dai-ichi Kogyo Seiyaku Co., Ltd.): 7.50 parts
Ion exchanged water: 442.50 parts A colorant-dispersed solution 1 in which the concentration of colorant fine particle 1 was 10 mass % was obtained by weighing out and mixing the materials listed above and dispersing for approximately 1 hour using a Nanomizer high pressure impact disperser (available from Yoshida Kikai Co., Ltd.) so as to disperse the colorant.

The 50% particle diameter on a volume basis (D50) of the colorant fine particle 1 was measured using a dynamic light scattering particle size distribution analyzer (Nanotrac UPA-EX150 available from Nikkiso Co., Ltd.), and found to be 0.20 μm.

Production of Toner 26
Polymer-dispersed solution: 500.00 parts
Wax-dispersed solution 1: 50.00 parts
Colorant-dispersed solution 1: 80.00 parts
Ion exchanged water: 160.00 parts The materials listed above were placed in a round stainless steel flask and mixed. Next, the obtained mixed solution was dispersed for 10 minutes at 5000 r/min using a homogenizer (Ultratarax T50 available from IKA). A 1.0% aqueous solution of nitric acid was added to adjust the pH to 3.0, and the mixed solution was then heated to 58° C. in a heating water bath while appropriately adjusting the speed of rotation of a stirring blade so that the mixed solution was stirred.

The volume average particle diameter of the formed aggregated particles was appropriately confirmed using a Coulter Multisizer III, and when aggregated particles having a volume average particle diameter of approximately 6.0 μm were formed, the pH was adjusted to 9.0 using a 5% aqueous solution of sodium hydroxide.

The solution was then heated to 75° C. while continuing the stirring. The aggregate particles were fused together by maintaining a temperature of 75° C. for 1 hour.

Crystallization of the polymer was then facilitated by cooling to 50° C. and maintaining this temperature for 3 hours.

The mixture was then cooled to 25° C., filtered, subjected to solid-liquid separation, and then washed with ion exchanged water.

Following completion of the washing, toner particle 26 having a weight-average particle diameter (D4) of 6.07 μm was obtained by drying with a vacuum dryer.

The toner 26 was obtained by subjecting toner particle 26 to the same external addition as that carried out in Example 1. Physical properties of toner 26 are shown in Table 2, and evaluation results are shown in Table 4.

Example 27

Production of Toner by Pulverization Method
Polymer AO: 100.00 parts
C.I. Pigment Blue 15:3: 6.50 parts
Fischer Tropsch wax: 2.00 parts
(HNP-51, available from Nippon Seiro Co., Ltd., melting point: 74° C.)
Charge control agent (T-77, available from Hodogaya Chemical Co., Ltd.): 2.00 parts The materials listed above were pre-mixed using an FM mixer (available from Nippon Coke & Engineering Co., Ltd.), and then melt kneaded using a twin screw kneading extruder (PCM-30 available from Ikegai Corporation).

Toner particle 27, which had a weight-average particle diameter (D4) of 7.0 μm, was obtained by cooling the obtained kneaded product, coarsely pulverizing using a hammer mill, pulverizing using a mechanical pulverizer (T-250 available from Turbo Kogyo), and classifying the obtained finely pulverized powder using a multiple section sorting apparatus using the Coanda effect.

Toner 27 was obtained by subjecting toner particle 27 to the same external addition as that carried out in Working Example 1. Physical properties of toner 27 are shown in Table 2, and evaluation results are shown in Table 4.

Examples 28 to 30

Preparation of Amorphous Resin-dispersed Solution
Toluene: 300.00 parts
Amorphous resin: 100.00 parts The materials listed above were weighed out, mixed and dissolved at 90° C.

Separately, 5.0 parts of sodium dodecylbenzene sulfonate and 10.0 parts of sodium laurate were added to 700.0 parts of ion exchanged water, and dissolved by heating at 90° C.

Next, the toluene solution and aqueous solution mentioned above were mixed together and stirred at 7000 rpm using a T.K. Robomix ultrahigh speed stirrer (available from Primix Corporation).

The obtained mixture was then emulsified at a pressure of 200 MPa using a Nanomizer high pressure impact disperser (available from Yoshida Kikai Co., Ltd.). An amorphous resin-dispersed solution containing amorphous resin fine particles at a concentration of 20 mass % was then obtained by removing the toluene using an evaporator and adjusting the concentration by means of ion exchanged water.

The 50% particle diameter on a volume basis (D50) of the amorphous resin fine particles was measured using a dynamic light scattering particle size distribution analyzer Nanotrac UPA-EX150 (available from Nikkiso Co., Ltd.), and found to be 0.38 μm.

Production of Toners 28 to 30

Toner particles 28 to 30 were obtained in the same way as in (Production of toner 26), except that the usage amounts of the dispersed solutions were altered in the manner shown in Table 3.

In addition, toners 28 to 30 were obtained by performing external addition to toner particles 28 to 30 in the same way as in (Production of toner 26). Physical properties of toners 28 to 30 are shown in Table 2, and evaluation results are shown in Table 4.

TABLE 3

| | Polymer-dispersed solution Parts by mass | Amorphous resin-dispersed solution Parts by mass | Wax-dispersed solution Parts by mass | Colorant-dispersed solution Parts by mass |
|---|---|---|---|---|
| Example26 | 500.0 | — | 50.0 | 80.0 |
| Example28 | 410.0 | 90.0 | 50.0 | 80.0 |
| Example29 | 260.0 | 240.0 | 50.0 | 80.0 |
| Example30 | 240.0 | 260.0 | 50.0 | 80.0 |

Comparative Examples 1 to 8

Comparative toner particles 1 to 8 and comparative toners 1 to 8 were obtained in the same way as in Example 1, except that the type and added amount of polymerizable monomer composition used were altered in the manner shown in Table 1.

Physical properties of comparative toners 1 to 8 are shown in Table 2, and evaluation results are shown in Table 4.

Toner Evaluation Methods

<1> Low-Temperature Fixability

A process cartridge charged with a toner was allowed to stand for 48 hours in a normal temperature normal humidity (N/N) environment (a temperature of 23° C. and a relative humidity of 60%). Using a Canon LBP-712Ci printer modified so as to be operable even with the fixing unit removed, a square image measuring 10 mm×10 mm was outputted as an unfixed image of an image pattern, in which nine points were uniformly arranged, onto the entire surface of a transfer paper.

The amount of toner applied to the transfer paper was 0.80 mg/cm², and the fixing onset temperature was evaluated. Moreover, the transfer paper was Canon Oce Red Label (80 g/m²).

The fixing unit of the LBP-712Ci was removed, and an external fixing unit configured so as to be operable outside a laser printer was used. Moreover, the external fixing unit was such that the fixation temperature was increased from 100° C. at intervals of 10° C. and fixing was performed at a process speed of 280 mm/sec.

A fixed image was rubbed using a lens-cleaning paper (Lenz Cleaning Paper "Dasper®" (Ozu Paper Co. Ltd.)) while applying a load of 50 g/cm². In addition, low-temperature fixability was evaluated using the criteria shown below, with the fixing onset temperature taken to be a temperature at which the density decrease rate following rubbing reached 20% or less. The evaluation results are shown in Table 4.

Evaluation Criteria

A: Fixing onset temperature is 110° C.
B: Fixing onset temperature is 120° C.
C: Fixing onset temperature is 130° C.
D: Fixing onset temperature is at least 140° C.

<2> Bending Resistance

A process cartridge charged with a toner was allowed to stand for 48 hours in a normal temperature normal humidity (N/N) environment (a temperature of 23° C. and a relative humidity of 60%). Using a Canon LBP-712Ci printer modified so as to be operable even with the fixing unit removed, a square image measuring 30 mm×30 mm was outputted as an unfixed image of an image pattern, in which nine points were uniformly arranged, onto the entire surface of a transfer paper.

The amount of toner applied to the transfer paper was 1.20 mg/cm². Moreover, the transfer paper was Canon Oce Red Label (80 g/m²).

The fixing unit of the LBP-712Ci was removed, and an external fixing unit configured so as to be operable outside a laser printer was used. Moreover, the fixation temperature was adjusted to be 10° C. higher than the fixing onset temperature of the toners in the <1> Low-temperature fixability section above, and a fixed image was obtained at a process speed of 280 mm/sec.

Next, the fixed image was folded into the shape of a cross and rubbed back and forth five times using a soft thin paper ("Dasper" available from Ozu Co., Ltd.) while applying a load of 4.9 kPa. In this case, a sample was obtained in which toner detached from the folded cross part and the texture of the paper could be seen.

Next, a region of the folded cross part measuring 512 pixels square was photographed at a resolution of 800 pixels/inch using a CCD camera.

The threshold value was set to 60%, and the image was binarized. Parts from where the toner had detached are white, and a smaller areal ratio of white parts means superior bending resistance. The evaluation results are shown in

TABLE 4

Evaluation Criteria

A: Areal ratio of white parts is less than 1.0%
B: Areal ratio of white parts is at least 1.0% less than 2.0%
C: Areal ratio of white parts is at least 2.0% less than 3.0%
D: Areal ratio of white parts is at least 3.0%

<3> Durability

Durability was evaluated using a commercially available Canon LBP-712Ci printer.

The LBP-712Ci uses mono-component contact development, and regulates the amount of toner on a developer carrier by means of a toner control member.

A cartridge obtained by wiping toner contained in a commercially available cartridge, cleaning the inner part of the cartridge with an air blower and then filling with 200 g of the toner mentioned above was used as an evaluation cartridge.

Evaluation was carried out by fitting the cartridge mentioned above to a cyan station and fitting dummy cartridges to other stations.

In a normal temperature normal humidity (N/N) environment (a temperature of 23° C. and a relative humidity of 60%), images having a print percentage of 1% were continuously outputted using Canon Oce Red Label (80 g/m$^2$).

20,000 images were outputted, solid images and half tone images were outputted, and the presence or absence of so-called development streaks in the circumferential direction caused by toner melting and attaching to the control member was confirmed visually. The evaluation results are shown in Table 4.

Evaluation Criteria
A: no development streaks
B: development streaks occurred in at least one location and not more than two locations
C: development streaks occurred in at least three locations and not more than four locations
D: development streaks occurred in at least five locations <4> Heat-Resistant Storage Stability Heat-resistant storage stability was evaluated in order to evaluate stability during storage.

6 g of toner was placed in a 100 mL polypropylene cup, which was left to stand for 10 days in an environment at a temperature of 50° C. and a humidity of 20%, after which the degree of agglomeration of the toner was measured in the manner described below, and evaluated according to the criteria shown below.

An apparatus obtained by connecting a digital display type vibrometer Digi-Vibro Model 1332A (available from Showasokki Co., Ltd.) to a side surface of a "Powder Tester" vibrating table (available from Hosokawa Micron Corp.) was used as the measurement apparatus.

A sieve having an opening size of 38 μm (400 mesh), a sieve having an opening size of 75 μm (200 mesh) and a sieve having an opening size of 150 μm (100 mesh) were overlaid and set in that order from above on the vibrating table of the Powder Tester in that order. Measurements were carried out in the manner described below in an environment at a temperature of 23° C. and a relative humidity of 60%.
(1) The amplitude of the vibrating table was adjusted in advance so that the amount of displacement of the digital display type vibrometer was 0.60 mm (peak-to-peak).
(2) The toner that had been allowed to stand for 10 days in the manner described above was allowed to stand for 24 hours in an environment at a temperature of 23° C. and a relative humidity of 60%, after which 5 g of this toner was weighed out and gently placed on the uppermost sieve, which had an opening size of 150 μm.
(3) After vibrating the sieve for 15 seconds, the mass of toner remaining on each sieve was measured, and the degree of agglomeration was calculated on the basis of the formula below. The evaluation results are shown in Table 4.

Degree of agglomeration (%)={(mass (g) of sample on sieve having opening size of 150 μm)/5 (g)}×100+{(mass (g) of sample on sieve having opening size of 75 μm)/5 (g)}×100×0.6+{(mass (g) of sample on sieve having opening size of 38 μm)/5 (g)}×100×0.2

Evaluation Criteria are as Follows
A: Degree of agglomeration is less than 20%
B: Degree of agglomeration is at least 20% less than 25%
C: Degree of agglomeration is at least 25% less than 30%
D: Degree of agglomeration is at least 30%

TABLE 4

| | Low-temperature fixability | Bending resistance | Durability | Heat-resistant storage stability |
|---|---|---|---|---|
| Example1 | A | A | A | A |
| Example2 | C | A | A | C |
| Example3 | A | C | C | A |
| Example4 | A | C | C | B |
| Example5 | C | A | A | B |
| Example6 | C | C | C | C |
| Example7 | A | A | A | A |
| Example8 | A | A | A | B |
| Example9 | A | A | B | B |
| Example10 | A | A | B | C |
| Example11 | B | B | B | B |
| Example12 | A | C | C | B |
| Example13 | A | A | A | C |
| Example14 | C | A | A | A |
| Example15 | C | A | A | A |
| Example16 | A | A | A | B |
| Example17 | A | A | A | A |
| Example18 | A | A | A | B |
| Example19 | C | A | A | C |
| Example20 | C | A | A | C |
| Example21 | B | A | A | A |
| Example22 | B | B | A | A |
| Example23 | B | B | A | A |
| Example24 | C | A | A | A |
| Example25 | A | C | B | A |
| Example26 | A | A | B | A |
| Example27 | A | A | B | A |
| Example28 | A | A | B | A |
| Example29 | B | A | B | A |
| Example30 | C | A | B | A |
| Example31 | A | A | A | A |
| Example32 | B | A | B | B |
| Comparative example1 | B | D | D | C |
| Comparative example2 | B | D | D | A |
| Comparative example3 | B | D | C | C |
| Comparative example4 | B | B | B | D |
| Comparative example5 | B | B | B | D |
| Comparative example6 | D | B | B | A |
| Comparative example7 | B | D | C | A |
| Comparative example8 | A | D | D | A |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application is a continuation of application Ser. No. 16/438,566 filed Jun. 12, 2019, which in turn claims the benefit of Japanese Patent Application No. 2018-113106, filed Jun. 13, 2018, Japanese Patent Application No. 2019-075008, filed Apr. 10, 2019, which are hereby incorporated by reference herein in their entirety.

What is claimed is:
1. A toner, comprising:
 a toner particle comprising a binder resin;
 the binder resin comprising polymer A, polymer A being a polymer of a composition containing a first polymerizable monomer, a second polymerizable monomer that is different from the first polymerizable monomer, and a crosslinking agent;

the first polymerizable monomer being at least one monomer selected from the group consisting of (meth)acrylic acid esters having an alkyl group with 18 to 36 carbon atoms, a content of the first polymerizable monomer in the composition being 5.0 to 40.0 mol% based on the total number of moles of all polymerizable monomers and the crosslinking agent in the composition;

a content of the second polymerizable monomer in the composition being 40.0 to 92.6 mol% based on the total number of moles of all polymerizable monomers and the crosslinking agent in the composition; and the crosslinking agent having two or more polymerizable double bonds, a content of the crosslinking agent in the composition being 0.2 to 5.0 mol% based on the total number of moles of all polymerizable monomers and the crosslinking agent in the composition, wherein $0.60 \leq (SP_{22}-SP_{12}) \leq 15.00$ and $SP_{12} < SP_{C2} < (SP_{22}+3.00)$ when $SP_{12}$ $(J/cm^3)^5$ is the SP value of the first polymerizable monomer, $SP_{22}$ $(J/cm^3)^5$ is the SP value of the second polymerizable monomer and $SP_{C2}$ $(J/cm^3)^5$ is the SP value of the crosslinking agent.

2. The toner according to claim 1, wherein a content of polymer A in the binder resin is at least 50.0 mass %.

3. The toner according to claim 1, wherein the first polymerizable monomer is at least one monomer selected from the group consisting of (meth)acrylic acid esters having a straight chain alkyl group with 18 to 36 carbon atoms.

4. The toner according to claim 1, wherein the second polymerizable monomer is at least one monomer selected from the group consisting of formulae (A) and (B)

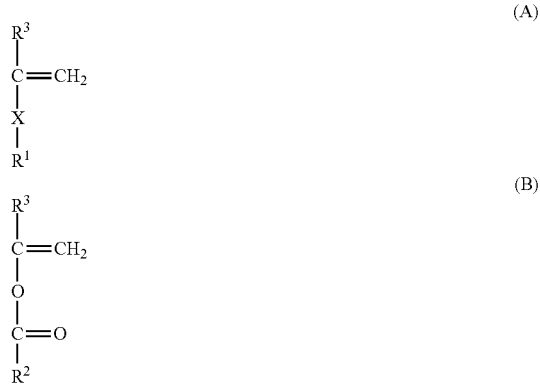

where X denotes a single bond or an alkylene group with 1 to 6 carbon atoms, $R^1$ denotes $-C \equiv N$, $-C(=O)NHR^{10}$ where $R^{10}$ is a hydrogen atom or an alkyl group with 1 to 4 carbon atoms, a hydroxyl group, $-COOR^{11}$ where $R^{11}$ is an alkyl group with 1 to 6 carbon atoms or a hydroxyalkyl group with 1 to 6 carbon atoms, $-NHCOOR^{12}$ where $R^{12}$ is an alkyl group with 1 to 4 carbon atoms, $-NH-C(=O)-N(R^{13})_2$, where $R^{13}$ groups are independently a hydrogen atom or an alkyl group with 1 to 6 carbon atoms, $-COO(CH_2)_2NHCOOR^{14}$ where $R^{14}$ is an alkyl group with 1 to 4 carbon atoms, or $-COO(CH_2)_2-NH-C(=O)-N(R^{15})_2$ where $R^{15}$ groups are independently a hydrogen atom or an alkyl group with 1 to 6 carbon atoms, $R^2$ denotes an alkyl group with 1 to 4 carbon atoms, and $R^3$ denotes a hydrogen atom or a methyl group.

5. The toner according to claim 1, wherein the second polymerizable monomer is at least one monomer selected from the group consisting of following formulae (A) and (B)

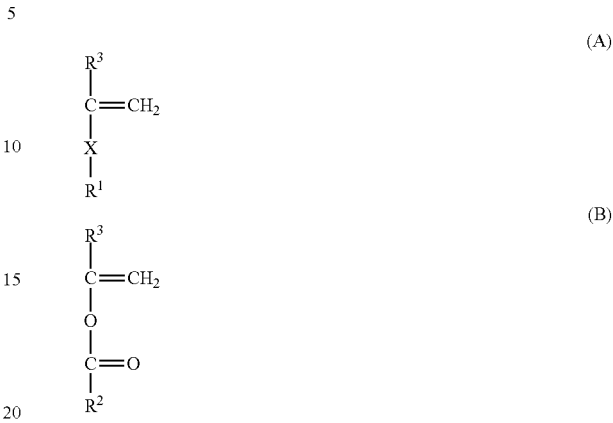

where X denotes a single bond or an alkylene group with 1 to 6 carbon atoms, $R^1$ denotes $-C \equiv N$, an amido group $-C(=O)NHR^{10}$, where $R^{10}$ is a hydrogen atom or an alkyl group with 1 to 4 carbon atoms, a hydroxyl group, $-COOR^{11}$ where $R^{11}$ is an alkyl group with 1 to 6 carbon atoms or a hydroxyalkyl group with 1 to 6 carbon atoms, $-NH-C(=O)-N(R^{13})_2$ where $R^{13}$ groups are independently a hydrogen atom or an alkyl group with 1 to 6 carbon atoms, $-COO(CH_2)_2NHCOOR^{14}$ where $R^{14}$ is an alkyl group with 1 to 4 carbon atoms, or $-COO(CH_2)_2-NH-C(=O)-N(R^{15})_2$ where $R^{15}$ groups are independently a hydrogen atom or an alkyl group with 1 to 6 carbon atoms, $R^2$ denotes an alkyl group with 1 to 4 carbon atoms, and $R^3$ denotes a hydrogen atom or a methyl group.

6. The toner according to claim 1, wherein the composition further comprises a third polymerizable monomer that is different from each of the first polymerizable monomer, the second polymerizable monomer and the crosslinking agent, the third polymerizable monomer being at least one polymerizable monomer selected from the group consisting of styrene, methyl methacrylate and methyl acrylate.

7. The toner according to claim 1, wherein $(SP_{22min}-SP_{C2}) < (SP_{C2}-SP_{12max})$ when $SP_{12max}$ $(J/cm^3)^{0.5}$ is the SP value of a polymerizable monomer having the highest SP value among the first polymerizable monomers, $SP_{22max}$ $(J/cm^3)^{0.5}$ is the SP value of a polymerizable monomer having the lowest SP value among the second polymerizable monomers, and $SP_{22min}$ $(J/cm^3)^{0.5}$ is the SP value of the crosslinking agent.

8. The toner according to claim 1, wherein the crosslinking agent has a molecular weight of at least 300.

9. The toner according to claim 1, wherein the first polymerizable monomer is at least one monomer selected from the group consisting of stearyl (meth)acrylate and behenyl (meth)acrylate.

10. The toner according to claim 1, wherein the content of the crosslinking agent in the composition is 0.2 to 2.8 mol % based on the total number of moles of all polymerizable monomers and the crosslinking agent in the composition.

11. The toner according to claim 1, wherein the content of the second polymerizable monomer in the composition is 40.0 to 70.0 mol% based on the total number of moles of all polymerizable monomers and the crosslinking agent in the composition.

12. A method for producing a toner having a toner particle, the method comprising
  a step of forming a particle of a polymerizable monomer composition containing polymerizable monomers in an aqueous medium, and
  a step of obtaining the toner particle, which contains polymer A obtained by polymerizing the polymerizable monomers contained in the particle,
  the polymerizable monomer composition containing a first polymerizable monomer, a second polymerizable monomer that is different from the first polymerizable monomer, and a crosslinking agent,
  the first polymerizable monomer being at least one monomer selected from the group consisting of (meth)acrylic acid esters having an alkyl group with 18 to 36 carbon atoms, a content of the first polymerizable monomer in the composition being 5.0 to 40.0 mol % based on the total number of moles of all polymerizable monomers and the crosslinking agent in the composition;
  a content of the second polymerizable monomer in the composition being 40.0 to 92.6 mol % based on the total number of moles of all polymerizable monomers and the crosslinking agent in the composition; and
  the crosslinking agent having two or more polymerizable double bonds, a content of the crosslinking agent in the composition being 0.2 to 5.0 mol % based on the total number of moles of all polymerizable monomers and the crosslinking agent in the composition, wherein $0.60 \leq (SP_{22}-SP_{12}) \leq 15.00$ and $SP_{12} < SP_{C2} < (SP_{22}+3.00)$ when $SP_{12}$ $(J/cm^3)^5$ is the SP value of the first polymerizable monomer, $SP_{22}$ $(J/cm^3)^5$ is the SP value of the second polymerizable monomer and $SP_{C2}$ $(J/cm^3)^5$ is the SP value of the crosslinking agent.

* * * * *